(12) United States Patent
Hill et al.

(10) Patent No.: US 7,302,939 B2
(45) Date of Patent: Dec. 4, 2007

(54) EXHAUST GAS RECIRCULATION METHODS AND APPARATUS FOR REDUCING NOX EMISSIONS FROM INTERNAL COMBUSTION ENGINES

(75) Inventors: Philip G. Hill, Vancouver (CA); Mark E. Dunn, Vancouver (CA); Sandeep Munshi, Vancouver (CA)

(73) Assignee: Westport Power Inc., Vancouver, B.C. (CA)

( * ) Notice: Subject to any disclaimer, the term of this patent is extended or adjusted under 35 U.S.C. 154(b) by 0 days.

(21) Appl. No.: 11/092,094

(22) Filed: Mar. 29, 2005

(65) Prior Publication Data
US 2005/0224060 A1  Oct. 13, 2005

Related U.S. Application Data

(63) Continuation of application No. PCT/CA03/01466, filed on Oct. 2, 2003.

(30) Foreign Application Priority Data
Oct. 2, 2002  (CA) .................................... 2406267

(51) Int. Cl.
*F02B 47/08* (2006.01)
*F02B 47/00* (2006.01)

(52) U.S. Cl. .............................. 123/568.12; 123/568.21

(58) Field of Classification Search ............ 123/568.2, 123/568.21, 568.12, 568.11, 568.15, 559.1, 123/559.2, 563
See application file for complete search history.

(56) References Cited

U.S. PATENT DOCUMENTS 3,703,886 A    11/1972  Witzky
5,520,161 A    5/1996   Klopp
5,553,575 A    9/1996   Beck et al.
6,138,649 A    10/2000  Khair et al.
6,279,550 B1 * 8/2001   Bryant ..................... 123/559.1
6,286,482 B1   9/2001   Flynn et al.
6,347,619 B1 * 2/2002   Whiting et al. ......... 123/568.12
6,367,443 B1   4/2002   Bassi et al.
6,405,720 B1   6/2002   Collier, Jr.
6,598,584 B2 * 7/2003   Beck et al. ................. 123/299
2002/0078918 A1 * 6/2002  Ancimer et al. ............ 123/295

FOREIGN PATENT DOCUMENTS

EP       0320959 A2     6/1989
JP       2002-206441    7/2002
JP       2002-221037    8/2002
WO       WO 97/04229    2/1997
WO       WO 01/59285    8/2001

* cited by examiner

*Primary Examiner*—Mahmoud Gimie
(74) *Attorney, Agent, or Firm*—McAndrews, Held & Malloy, Ltd.

(57) ABSTRACT

A method of operating an internal combustion engine employs exhaust gas recirculation (EGR) in combination with directly injected gaseous fuels that are burned within the engine in a stratified combustion mode. An engine that employs EGR includes an injector adapted to provide a high pressure quantity of fuel into a combustion chamber within a given pressure range, at a given angle and through a nozzle hole size to help provide for EGR tolerance and, consequently, reduce emissions.

34 Claims, 22 Drawing Sheets

US 7,302,939 B2

EXHAUST GAS RECIRCULATION METHODS AND APPARATUS FOR REDUCING NOX EMISSIONS FROM INTERNAL COMBUSTION ENGINES

CROSS-REFERENCE TO RELATED APPLICATIONS(S)

This application is a continuation of International Application No. PCT/CA2003/001466, having an international filing date of Oct. 2, 2003, entitled "Exhaust Gas Recirculation Methods And Apparatus For Reducing NOx Emissions From Internal Combustion Engines". International Application No. PCT/CA2003/001466 claimed priority benefits, in turn, from Canadian Patent Application No. 2,406,267 filed Oct. 2, 2002. International Application No. PCT/CA2003/001466 is also hereby incorporated by reference herein in its entirety.

FIELD OF THE INVENTION

This invention relates to methods and apparatus for using exhaust gas recirculation with gaseous-fuelled compression ignition internal combustion engines.

BACKGROUND OF THE INVENTION

Exhaust gas recirculation ("EGR") is used in diesel fuelled compression ignition engines to help reduce nitrogen oxide (NOx) emissions. EGR can reduce the concentration of oxygen in an intake charge entering the combustion environment to a level below the atmospheric concentration of oxygen. In EGR, a quantity of exhaust gas from one combustion cycle is retained in or routed back to the combustion chamber in a subsequent combustion cycle. The exhaust gas dilutes the oxygen in the intake charge.

An engine utilizing EGR typically starts with an intake charge that has an atmospheric oxygen concentration as it is drawn almost completely from the air. Oxygen is consumed during combustion of fuel. Exhaust gases from the combustion are depleted in oxygen. Consequently, where exhaust gases resulting from such combustion are mixed with an air intake charge, the concentration of oxygen within that charge is reduced.

It is well known that the use of EGR in diesel-fuelled compression-ignition engines can cause the engines to produce other pollutants. Combustion efficiency is the efficiency with which energy of a combustion event is converted into mechanical energy. As the oxygen concentration within the combustion environment falls, higher injection rates tend to be necessary to maintain combustion efficiency. The only practical ways to increase injection rates tend to result in increased emissions of particulates. EGR therefore has limited utility in reducing NOx emissions in current diesel engines.

Injection rates may be increased by increasing fuel injection pressures or by increasing the size or quantity of the injector nozzle openings. It is difficult to increase fuel injection pressure because diesel fuel is introduced at very high pressure. Diesel fuel injection pressures can be as high as 30,000 psi and are generally limited by injector and pump technology. Even a 2000 to 3000 psi increase in pressure would be insufficient to significantly impact injection rates.

Higher injection rates can also be achieved by increasing the injector opening size. However, increased injector opening size tends to reduce atomization of the diesel fuel, which can result in the formation of more particulates than would otherwise be the case. Increasing the number of injector openings can also lead to increases in the formation of particulates as neighboring fuel jets may interfere with one another.

While there are aftertreatment strategies for reducing the concentration of particulates in exhaust gases before those gases are expelled into the environment, particulate aftertreatment is particularly difficult and expensive to implement.

Aside from the overall emissions trade-off of utilizing EGR in diesel fuelled engines, the increased levels of particulates which result from higher levels of EGR can damage or interfere with the proper operation of components in EGR systems.

Some compression-ignition engines burn gaseous fuels such as natural gas. While such engines have a reduced tendency to generate particulates, there are other obstacles to the use of EGR in such engines. As natural gas auto-ignites at a temperature well above that needed for diesel fuel, a pilot fuel is often used to initiate combustion. Once the natural gas is ignited at a point within the combustion chamber, these natural gas fuelled engines rely on propagation of a flame front traveling from the ignition source throughout the combustion chamber to burn the fuel/air mixture.

High EGR levels can cause inefficient combustion or misfires. Maintaining a high flame speed is important for efficiency reasons. As charge-to-fuel ratio is increased, flame speed tends to fall resulting in loss in efficiency. In the limiting case, the flame speed falls to zero before the fuel is fully burned and a partial misfire occurs.

There is a need to provide reduced emission internal combustion engines.

SUMMARY OF THE INVENTION

This invention provides methods and apparatus which apply EGR in compression-ignition engines which burn directly-injected gaseous fuel. In specific embodiments of the invention, engine operating parameters permit higher EGR levels and reduced sensitivity to misfire. Injection pressure may be varied to maintain combustion efficiency at higher EGR rates. In some embodiments of the invention EGR is used to warm the intake charge. This helps to create a more favorable ignition environment for natural gas.

Accordingly, one aspect of the invention provides a method of operating a gaseous-fuelled internal combustion engine. The method comprises: directing an intake charge from an intake line into a combustion chamber of the internal combustion engine; compressing the intake charge within the combustion chamber; directly injecting a gaseous fuel into the compressed intake charge within the combustion chamber; igniting the gaseous fuel; burning the gaseous fuel; directing exhaust gas produced during combustion of the gaseous fuel from the combustion chamber into an exhaust line; and, directing a quantity of the exhaust gas from the exhaust line through an EGR line to the intake line, wherein a subsequent intake charge comprises the quantity of the exhaust gas.

Another aspect of the invention provides a method of operating a gaseous fuelled internal combustion engine. The method comprises: directing an intake charge into a combustion chamber of the internal combustion engine; compressing the intake charge within the combustion chamber; directly injecting a gaseous fuel into the combustion chamber; igniting the gaseous fuel; burning the gaseous fuel; determining a desired EGR mass, and a desired total charge mass; directing a quantity of exhaust gas generated by combustion of the gaseous fuel out of the combustion chamber; preventing a remaining quantity of the exhaust gas from escaping the combustion chamber, the remaining quantity set by the desired EGR mass; and, introducing a subsequent intake charge into the combustion chamber, the subsequent intake charge having a mass based on the desired total charge mass less the desired EGR mass.

A further aspect of the invention provides a method of operating an internal combustion engine. The method comprises: directing an intake charge from an intake line into the combustion chamber of the internal combustion engine; compressing the intake charge; introducing a fuel into the intake charge within the combustion chamber; igniting the fuel; burning the fuel; directing exhaust gas generated by combustion of the fuel from the combustion chamber into an exhaust line; determining an emissions concentration within the exhaust gas, the emissions concentration being the concentration of one of:

(1) carbon monoxide,
(2) hydrocarbons,
(3) combined carbon monoxide and hydrocarbons,
(4) combined carbon monoxide and particulates,
(5) combined hydrocarbons and particulates, or
(6) combined carbon monoxide, hydrocarbons and particulates;

determining a EGR level set point at which the emissions concentration equals or exceeds a maximum emissions concentration; determining a predetermined quantity of the exhaust gas to direct through an EGR line, the quantity of the exhaust gas providing an EGR level below the set point; and, directing a quantity of the exhaust gas based on the predetermined quantity of the exhaust gas to an EGR line to the intake line, wherein a subsequent intake charge comprises the quantity of the exhaust gas.

Another aspect of the invention provides a gaseous-fuelled internal combustion engine. The engine comprises at least one cylinder with a piston, the cylinder and the piston partially defining a combustion chamber. The piston oscillates between top dead center and bottom dead center within the cylinder when the internal combustion engine is operating. The engine has a controller, capable of processing operational data to create an engine profile and a gaseous fuel injector capable of directly injecting a gaseous fuel into the combustion chamber. The injector is commanded by the controller. The engine has an intake line for introducing a charge into the combustion chamber through an intake valve, an exhaust line for directing exhaust gas resulting from combustion of the gaseous fuel from the combustion chamber through an exhaust valve, and, an EGR line through which the controller is capable of providing a quantity of the exhaust gas from the exhaust line through to the intake line.

Another further aspect of the invention provides an internal combustion engine. The engine comprises at least one at least one cylinder with a piston where the cylinder and the piston partially define a combustion chamber and the piston oscillates between top dead center and bottom dead center within the cylinder when the engine is operating. The engine further comprises a controller, capable of processing operational data to create an engine profile. Also included is a fuel injector capable of directly injecting a fuel into the combustion chamber where the injector is commanded by the controller and the injector defines injector nozzle holes of a diameter between 0.6 and 1.0 mm. The injector is commanded by the controller. Also included is an intake line for introducing a charge into the combustion chamber through an intake valve, an exhaust line for directing exhaust gas resulting from combustion of the fuel from the combustion chamber through an exhaust valve, and, an EGR line through which the controller is capable of providing a quantity of the exhaust gas from the exhaust line through to the intake line.

A further aspect of the invention provides a method of operating an internal combustion engine. The method comprises: directing an intake charge from an intake line into a combustion chamber of the internal combustion engine; compressing the intake charge within the combustion chamber; directly injecting a gaseous fuel into the compressed intake charge within the combustion chamber within a parameter range, the range at least one of a pressure of between 12 MPa and 30 MPa, and an angle of between 10 and 20 degrees below a fire deck, where the fire deck partially defines the combustion chamber; igniting the gaseous fuel; burning the gaseous fuel; directing exhaust gas produced during combustion of the gaseous fuel from the combustion chamber into an exhaust line; and, directing a quantity of the exhaust gas from the exhaust line through an EGR line to the intake line, wherein a subsequent intake charge comprises the quantity of the exhaust gas.

A further aspect of the invention provides a method of operating an internal combustion engine. The method comprises: directing an intake charge from an intake line into a combustion chamber of the internal combustion engine; compressing the intake charge within the combustion chamber; directly injecting a gaseous fuel into the compressed intake charge within the combustion chamber within a parameter range, the range at least one of a pressure of between 12 MPa and 30 MPa, and an angle of between 10 and 20 degrees below a fire deck, where the fire deck partially defines the combustion chamber; burning the gaseous fuel in a stratified combustion mode or a diffusion combustion mode; directing exhaust gas produced during combustion of the gaseous fuel from the combustion chamber into an exhaust line; and, directing a quantity of the exhaust gas from the exhaust line through an EGR line to the intake line, wherein a subsequent intake charge comprises the quantity of the exhaust gas.

Further aspects of the invention and features of specific embodiments of the invention are described below.

BRIEF DESCRIPTION OF THE DRAWINGS

In drawings which illustrate non-limiting embodiments of the invention.

DETAILED DESCRIPTION OF PREFERRED EMBODIMENT(s)

This invention provides EGR apparatus and methods for engines in which fuel is directly injected. In this disclosure, "combustion of a stratified charge" includes diffusion combustion and combustion of partially mixed or stratified charges but does not include combustion of homogeneous charges. Likewise, "stratified combustion mode" is a mode of combustion of a fuel that is not homogeneous but instead stratified, and includes diffusion combustion.

Figure 1:
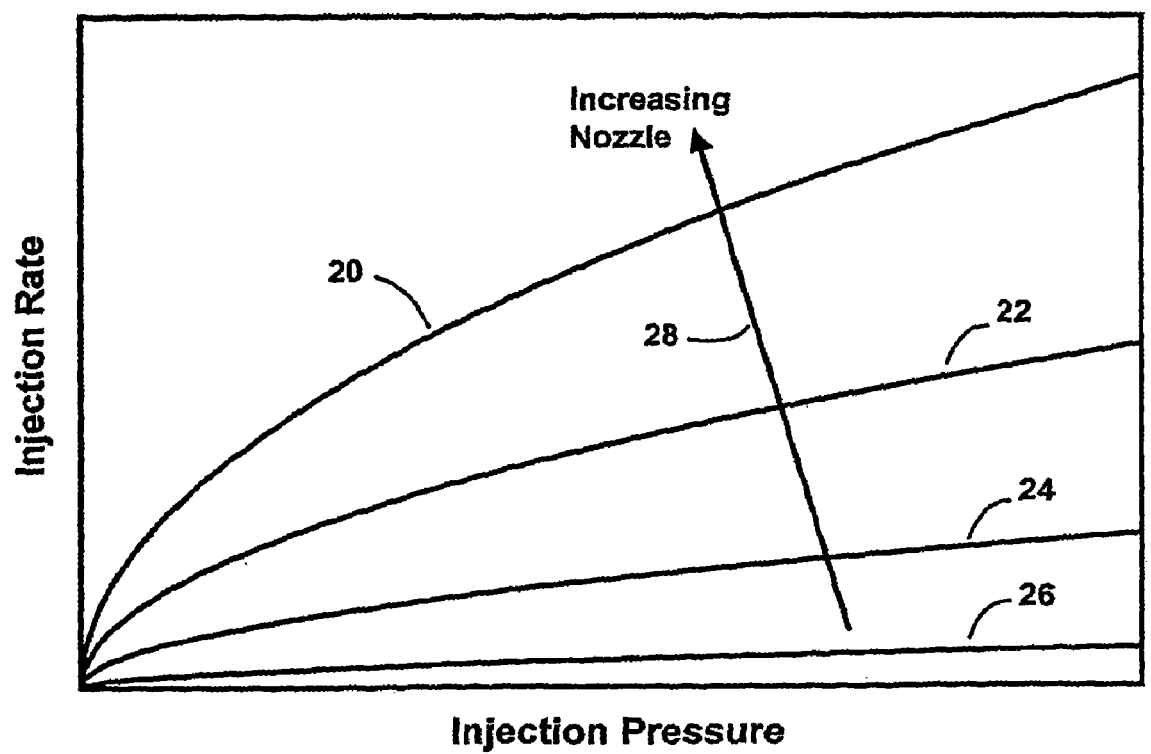
FIG. 1 is a graph of injection rate vs. injection pressure for a diesel injector.

In FIG. 1, curves 20, 22, 24, 26 all show injection rate of diesel fuel as a function of injection pressure. The curves are for different nozzle diameters with the nozzle diameters increasing in the direction of arrow 28.

Figure 2:
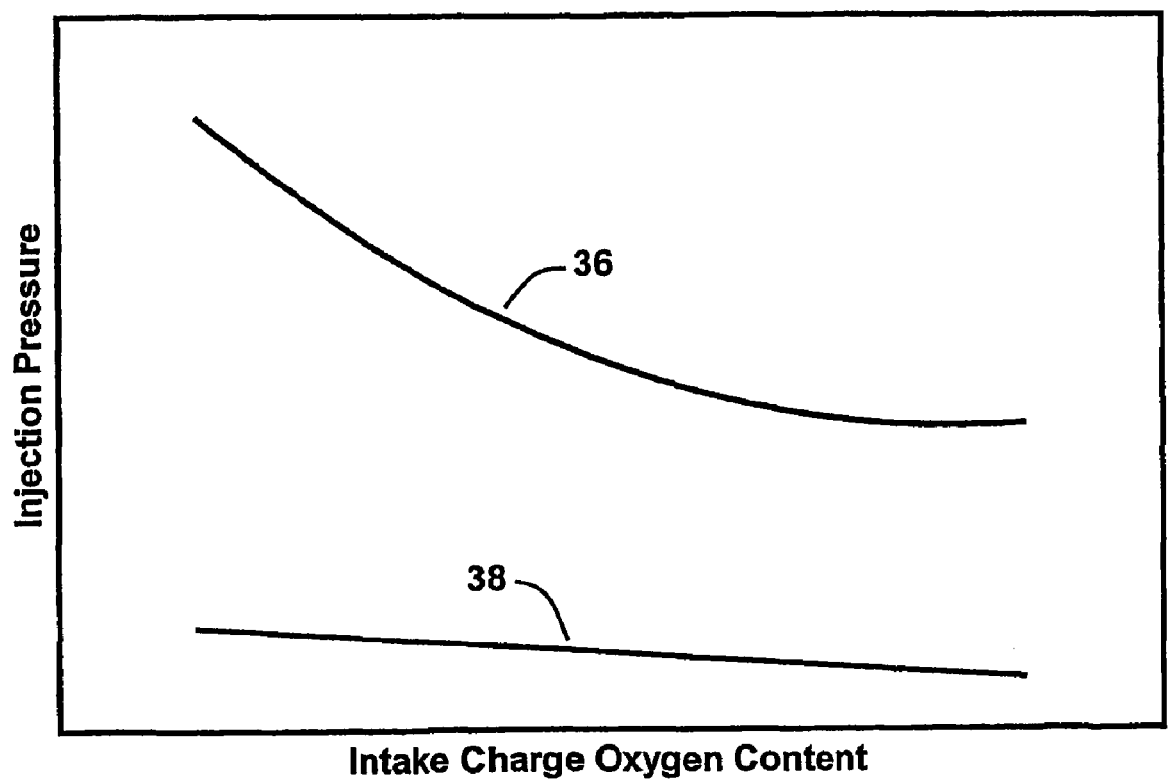
FIG. 2 is a graph of injection pressure required to maintain a level of combustion efficiency vs. $O_2$ concentration for both diesel and natural gas fueling strategies.

FIG. 2 shows injection pressure required to maintain combustion efficiency as a function of oxygen concentration of the intake air for both a diesel fuelled engine (curve 36) and a natural gas fuelled engine (curve 38).

Figure 3:
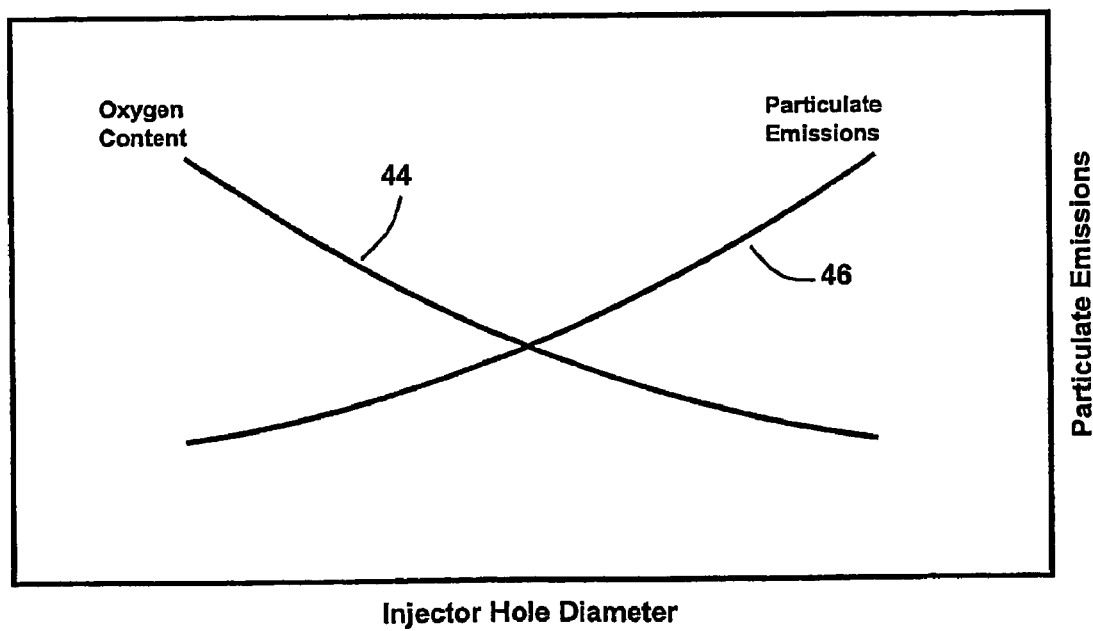
FIG. 3 is a graph of $O_2$ concentration and particulate emissions vs. injector hole diameter for diesel fuel injection.

FIG. 3 shows injector hole size plotted against oxygen concentration 44 and particulate concentration 46 for a diesel-fuelled engine where combustion efficiency is maintained.

FIGS. 1 through 3, illustrate problems that occur when attempting to use EGR to combat NOx formation in diesel-fuelled engines. FIG. 1 shows that, for a given injector hole size, increases in pressure provide relatively little increase in fuel delivered to a combustion chamber of a diesel-fuelled engine. Thus increased injection pressures cannot be used effectively in such engines to counter the effects of depleted oxygen environment within the combustion chamber.

As indicated by arrow 28, increased nozzle hole sizes can be used to increase injection rates. However, as shown in FIG. 3, particulate emissions increase when diesel fuel is introduced with large nozzle holes.

FIGS. 4A through 4D show a combustion chamber 50 of an engine equipped with an EGR system according to this invention. Piston 52 oscillates between top dead center and bottom dead center during a typical four-stroke cycle. Intake valve 54 and intake line 56 are provided along with exhaust valve 58 and exhaust line 60. Injector 62 is shown as well. Intake air 64 and exhaust gas 66 are provided as is gaseous fuel 68. Fuel 68 may comprise natural gas.

Figure 4A:
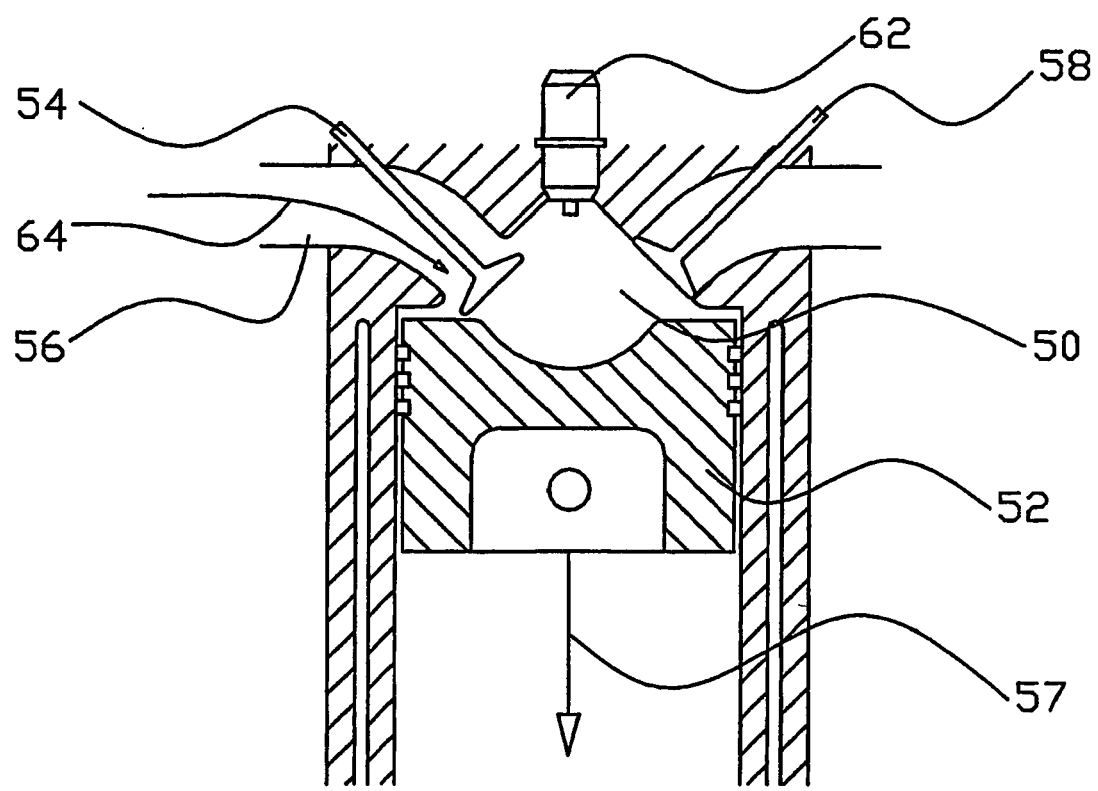
FIGS. 4A through 4D are respectively cross sections of a combustion chamber of an operating gaseous-fuelled internal combustion engine during intake, compression, power and exhaust strokes of the piston.
Figure 4B:
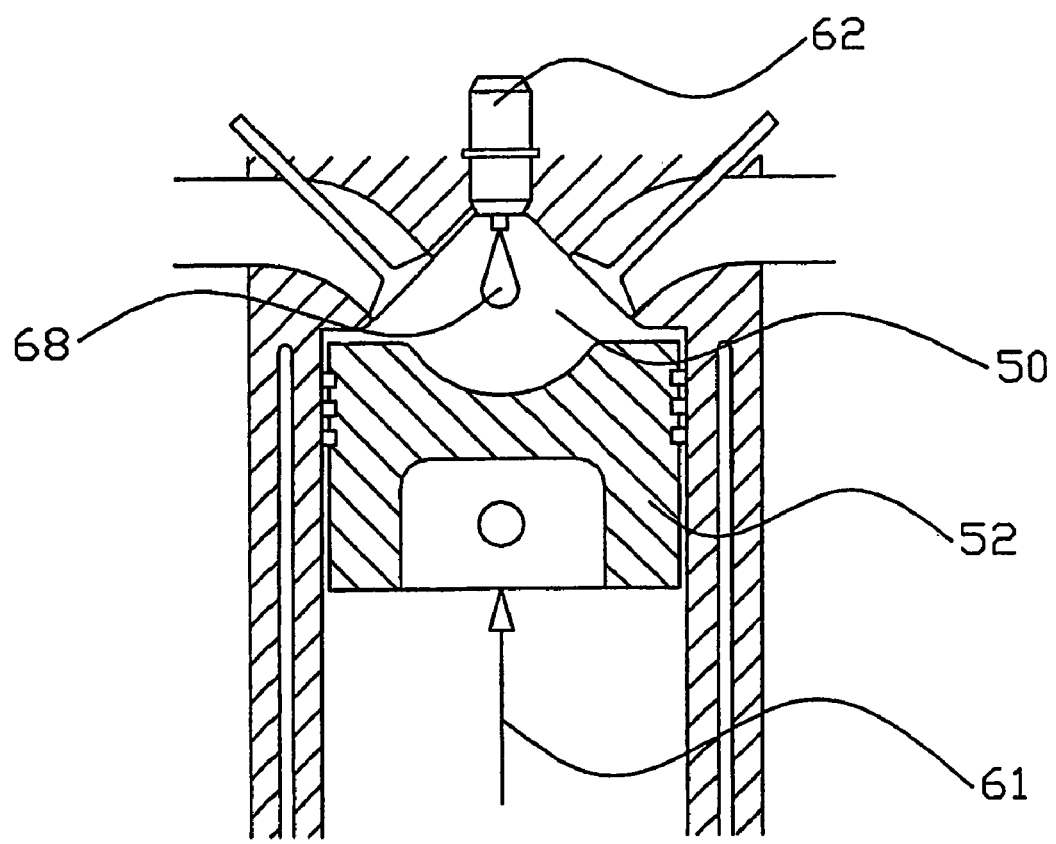
Figure 4C:
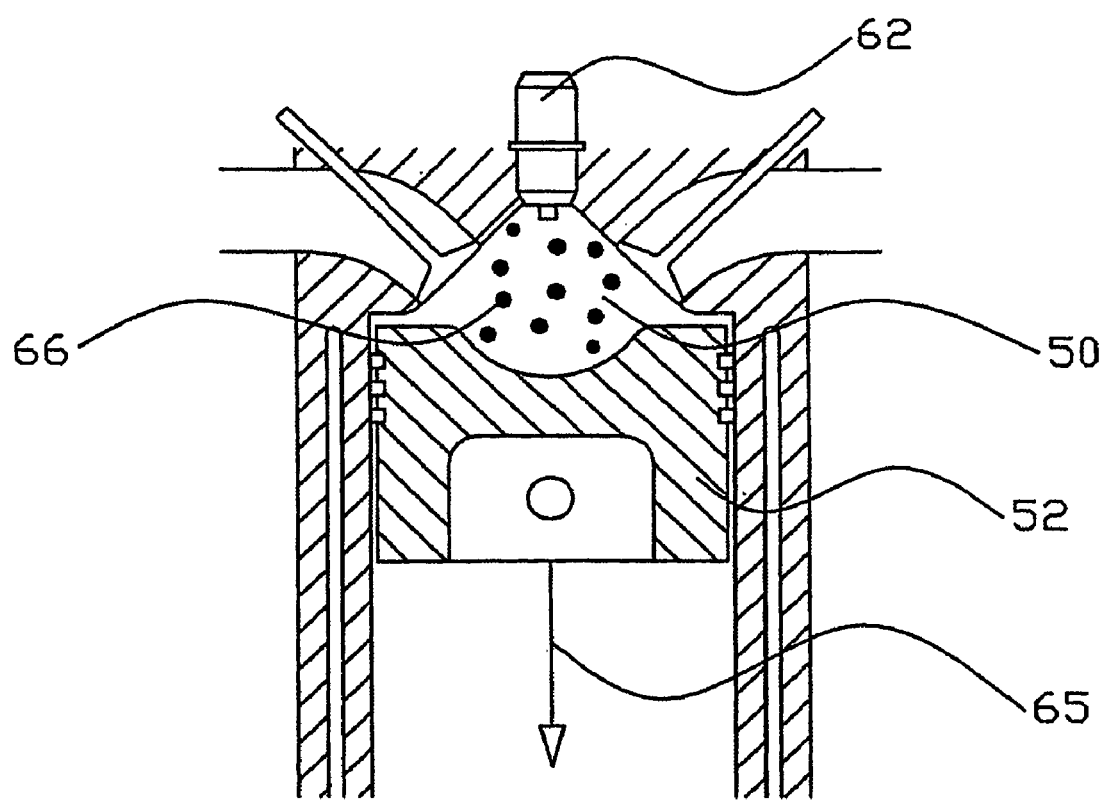
Figure 4D:
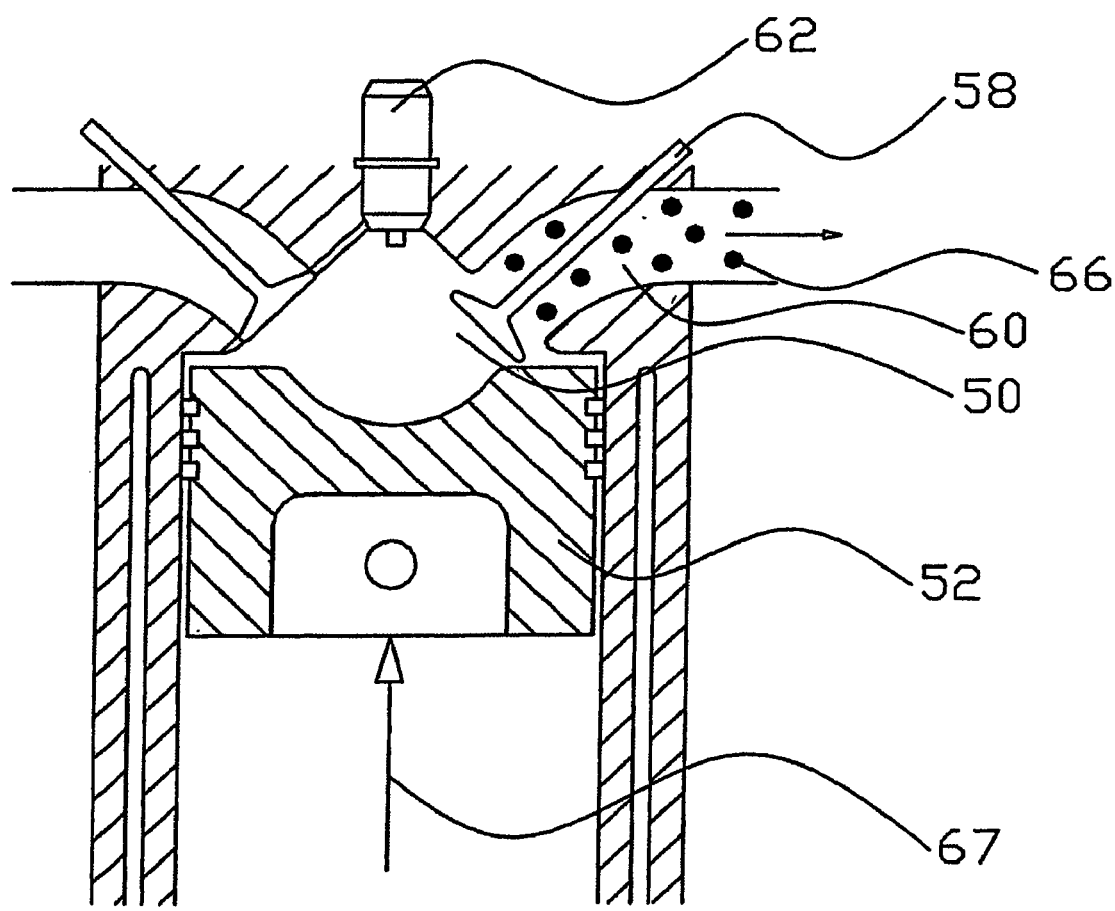

In FIG. 4A, piston 52 is moving in direction 57. In FIG. 4B, piston 52 is moving in direction 61. In FIG. 4C, piston 52 is moving in direction 65. In FIG. 4D, piston 52 is moving in direction 67.

While piston 52 is moving from top dead center downwards within combustion chamber 50, an amount of intake air 64 is drawn into the combustion chamber through intake line 56, past open intake valve 54. During the compression stroke of piston 52, as shown in FIG. 4B, the intake air is compressed within chamber 50. Once the piston has reached or is near top dead center and prior to or at the commencement of the power stroke, a quantity of gaseous fuel 68 is injected into the combustion chamber 50 through injector 62.

Fuel 68 burns in the combustion chamber. In doing so it releases energy which drives piston 52 during the power stroke. The fuel is ignited, in general, by ensuring an ignition environment within the combustion chamber. Ignition may be promoted by introducing a small quantity of an auto-ignitable fuel, such as diesel, into the combustion chamber. The more easily auto-ignitable fuel will, in general, either raise conditions within the combustion chamber to auto-ignition conditions for the main fuel or burn the main fuel. Other more auto-ignitable fuels may also be used as determined by the condition in question in the combustion chamber during the commencement of the power stroke and the auto-ignition properties of the main fuel.

Ignition and combustion may also be promoted by providing a hot surface within the combustion chamber. Under combustion chamber pressures the hot surface causes the gaseous fuel to ignite and propagate a flame throughout the combustion chamber.

Upon completion of the power stroke, exhaust valve 58 is opened to allow exhaust gas, generated from combustion of gaseous fuel 68, to be expelled through exhaust valve 58 into exhaust line 60.

A quantity of exhaust gas is then drawn from exhaust line 60 and routed through to intake line 56. As the amount of oxygen present in the original intake air is depleted after combustion-oxygen is used in the combustion process-the oxygen in the fresh air introduced through the intake line is diluted after the quantity of exhaust gas is introduced into the intake line. As such, the subsequent intake cycle will draw into the combustion chamber intake air that is of a lower oxygen concentration than would otherwise be the case. This depleted oxygen concentration is monitored to ensure that combustion efficiency is maintained or met for the demands required of the engine by the operator.

The oxygen concentration can be determined from calculations based on sensors installed in the intake and/or exhaust system that directly or indirectly monitor flows through the intake, exhaust, EGR and fuel systems.

As fuel 68 is injected directly at high pressure it burns within the combustion chamber according to the properties of the interface between the directly injected fuel and the intake charge. Combustion efficiency may be maintained by adjusting parameters such as the pressure at which fuel 68 is injected. Increasing injection pressure causes fuel 68 to be introduced more quickly into the combustion chamber and permits the amount of fuel injected to be increased. The amount of fuel introduced can also be controlled by, for example, increasing the hole size of nozzle 62 or altering the number of holes. Higher pressure can also increase turbulent mixing which can assist combustion where needed in a lower oxygen environment.

Higher speed, load and EGR rate will demand higher pressure to maintain efficiency. The converse is true at lower speeds, loads and EGR rates.

Typically, high pressure direct injection is practiced utilizing a set of parameters appropriate for high pressure direct injection. That is, fuel is introduced into a combustion chamber under conditions and using hardware designed to allow gaseous fuels to provide the exhaust gas conditions suitable for high levels of EGR and to provide the performance advantages of HPDI. The following illustrates such ranges:

| Parameter | Preferred/Example Range |
| --- | --- |
| 1. Injection Pressure | 12 MPa to 30 MPa |
| 2. Gas Jet Velocity | Sonic Velocity at Combustion Chamber Conditions |
| 3. Number of Injector Nozzle Holes for Gas | 5 to 10 |
| 4. Start of Injection for Gas | −20 to +5 ATDC |
| 5. Start of Injection for Pilot where Fuel is Used | Pilot 10 to 5 crank angle degrees ahead of gas |
| 6. Compression Ratio | 16 to 20 |
| 7. Injection Duration of Gas | 5 to 30 crank angle degrees |
| 8. Gas temperature in rail | 30° C. to 80° C. |
| 9. Injection angle | 10 to 20 degrees below fire deck |
| 10. Size of injector holes | 0.15 to 1 mm | where ATDC is "after top dead center" and is measure of crank angle degrees of the piston after top dead center.

FIGS. 5 through 10 are schematic views of a number of external EGR systems that may be used with high pressure direct injection engines according to the invention.

Figure 5A:
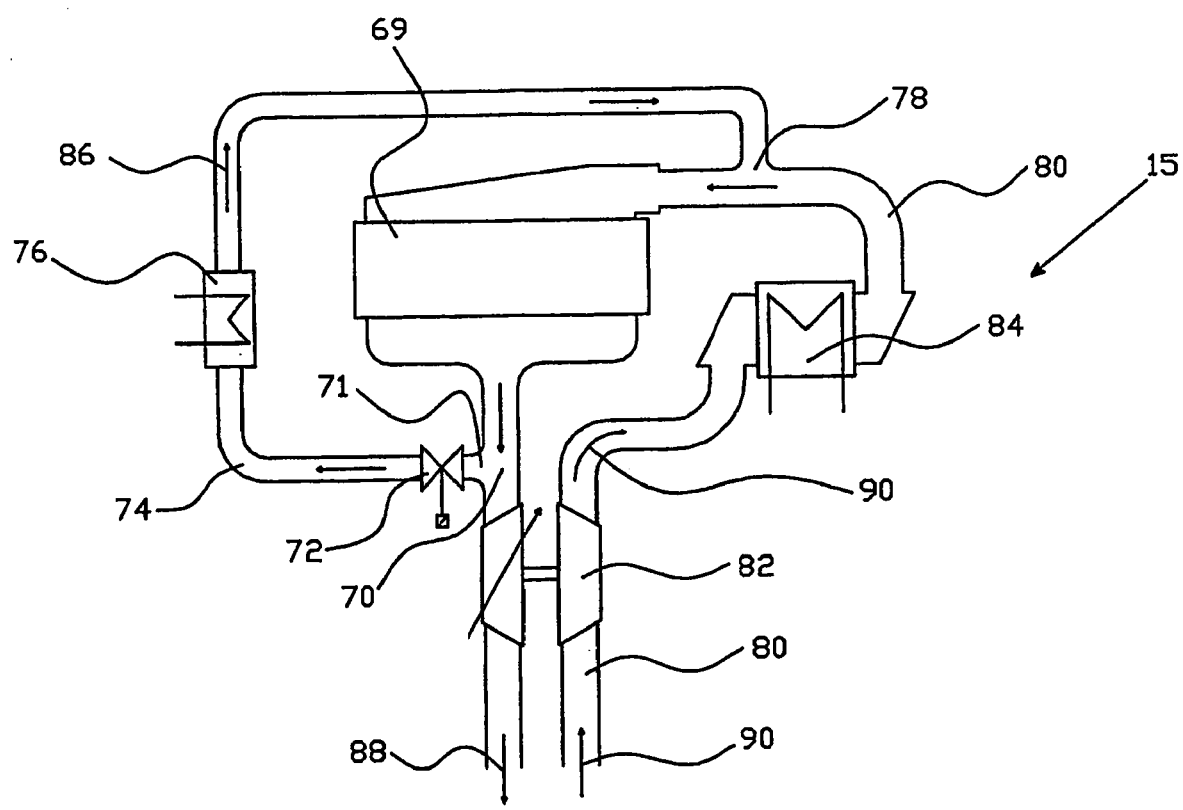
FIG. 5A is a schematic of an apparatus for utilizing EGR with a stratified gaseous combustion engine according to one embodiment of the invention.

FIG. 5a is a schematic of a first EGR system 15. In system 15, exhaust lines from a number of cylinders in an engine block 69 deliver exhaust gases to a common main exhaust line 70. An EGR line 74 branches off from exhaust line 70 at EGR junction 71 and joins an intake line 80 at junction 78. An EGR valve 72 is located in EGR line 74. EGR valve 72 may be located near EGR junction 71 or further downstream along EGR line 74 toward junction 78. EGR cooler 76 is disposed in EGR line 74 prior to EGR junction 78.

Intake line 80 carries air, typically atmospheric air, from an intake air source, through turbocharger 82. Turbocharger 82 may be a fixed or variable geometry turbocharger. A variable geometry turbocharger may have a variable geometry compressor. Turbocharger 82 may be equipped with a waste gate.

Intake air cooler 84 is disposed in intake line 80 downstream of turbocharger 82 and upstream of junction 78. Downstream from junction 78 the intake air is directed into intake lines for a number of combustion chambers. EGR flow direction 86, exhaust flow direction 88 and air flow direction 90 are all shown.

Figure 5B:
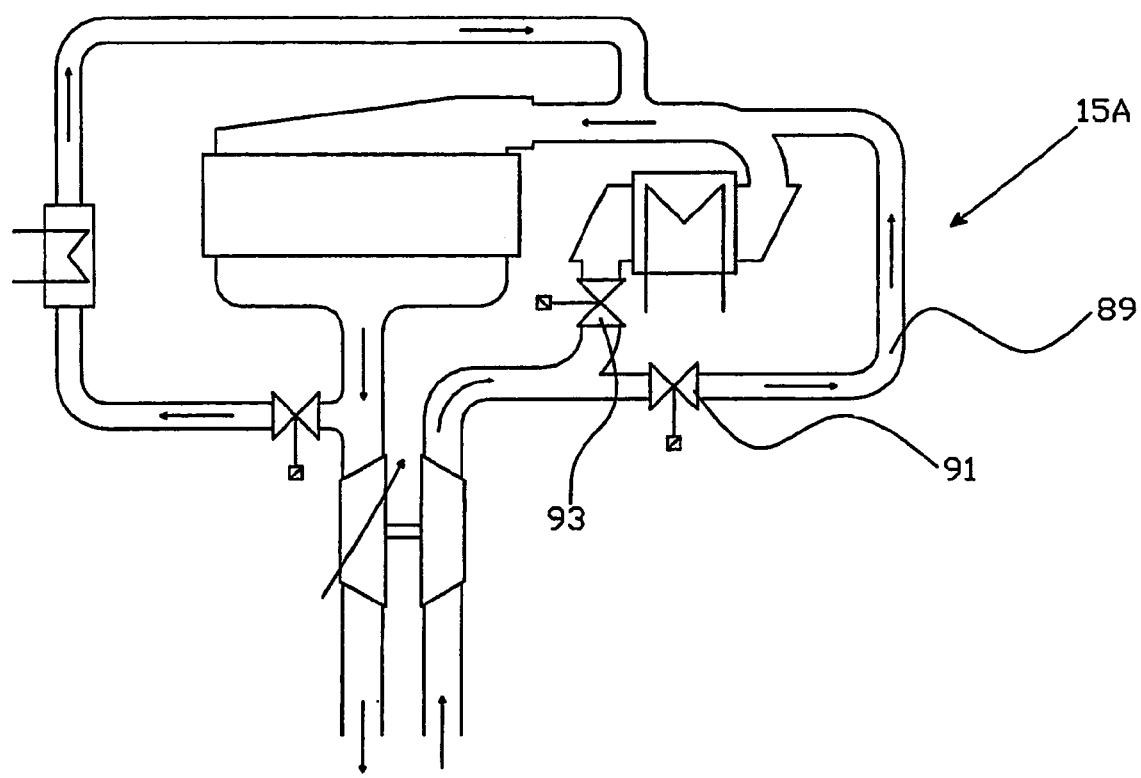
FIG. 5B is a schematic of an apparatus according to a variation of the embodiment of FIG. 5A.

FIG. 5B shows an EGR system 15A which is a variation of the EGR system of FIG. 5A. System 15A has an additional bypass line 89, bypass valve 91 and intake valve 93.

In the embodiments of FIGS. 5A and 5B, exhaust gas from any of a number of combustion chambers is collected in exhaust line 70. Exhaust line 70 carries exhaust gas past EGR junction 71 and through the turbine of turbocharger 82. Valve 72 adjusts a quantity of exhaust gas to be routed through EGR line 74 in direction 86 and into intake line 80. Valve 72 is restrictive enough to maintain a desired minimum flow of exhaust gas through turbocharger 82.

Prior to its introduction into intake line 80, the quantity of exhaust gases which pass through EGR line 74 is carried through EGR cooler 76. This allowing the exhaust gas density to increase and, in turn, allows more recirculated exhaust gas to be introduced into the intake air.

Intake air, initially a quantity of fresh air, is directed through intake line 80. It is compressed by turbocharger 82 and carried in intake flow direction 90 through cooler 84. At junction 78, exhaust gas from EGR line 74 is combined with intake flow. As the exhaust gas has been passed through cooler 76 and the intake air has been passed through cooler 84, each has had its density increased which helps to maintain engine efficiency.

In the embodiment of FIG. 5B, charge cooler bypass 89 permits the intake charge to bypass charger cooler 84 when valve 91 is opened. This can be used to manage combustion during low load operations. Making the mixed charge hotter than would otherwise be the case encourages combustion chamber conditions more suitable for ignition and complete combustion. Under low load conditions the charge density provided by coolers 76 and 84 maybe unnecessary.

Figure 6:
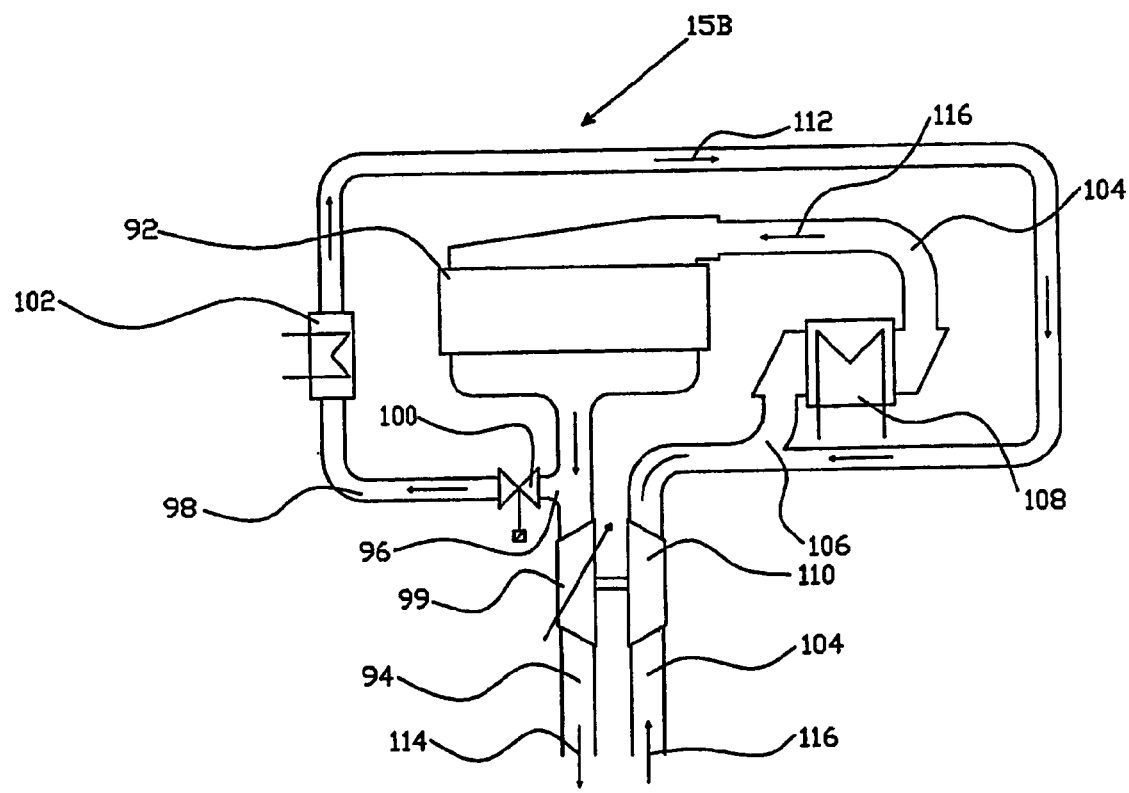
FIG. 6 is a schematic of an apparatus for utilizing EGR with a stratified gaseous combustion engine according to a second embodiment of the invention.

FIG. 6 shows EGR system 15B according to a second embodiment of the invention. In the embodiment of FIG. 6, recirculated exhaust gases are mixed with intake air upstream from an intake cooler 108.

Exhaust gas from each of a number of combustion chambers in an engine block 92 is carried into an exhaust line 94. At an EGR junction 96 an EGR line 98 meets exhaust line 94. EGR valve 100 is disposed within EGR line 98. An EGR cooler 102 is disposed downstream of EGR valve 100 within EGR line 98. EGR line 98 connects to intake line 104 at intake junction 106. Intake line 104 continues past intake junction 106 to intake charge cooler 108. A fixed or variable geometry turbocharger 110 compresses intake air upstream from intake junction 106. Beyond intake charge cooler 108, intake line 104 directs intake air into intake lines (not shown) leading to each of the combustion chambers of engine block 92.

EGR flow direction 112, exhaust flow direction 114 and intake air flow direction 116 are shown.

In the embodiment of FIG. 6, exhaust gas from any of a number of combustion chambers in engine block 92 is directed into exhaust line 94. At junction 96 a quantity of exhaust gas is directed through EGR valve 100 and into EGR line 98. This quantity of exhaust gas is then cooled as it passes through cooler 102 prior to arriving at intake junction 106. At junction 106, the recirculated quantity of exhaust gas is combined with an amount of fresh intake air that has been compressed by turbocharger 110. The resulting mixture of recirculated exhaust gases and fresh air is cooled as it passes through cooler 108 prior to being directed to engine block 92 and the intake lines leading to each cylinder. This arrangement is preferred where EGR is allowed to pass through charge cooler 108. As such, it is possible to eliminate cooler 102, if desired, reducing the components and expense of the system. As EGR from direct injection gaseous combustion is relatively free of particulates, filters are not required upstream of cooler 108 further reducing the complexity and expense of the system.

The systems of FIGS. 5 and 6 each incorporate a fixed or variable geometry turbocharger downstream of EGR junctions 71 and 96 and upstream of intake junctions 78 and 106.

Figure 7:
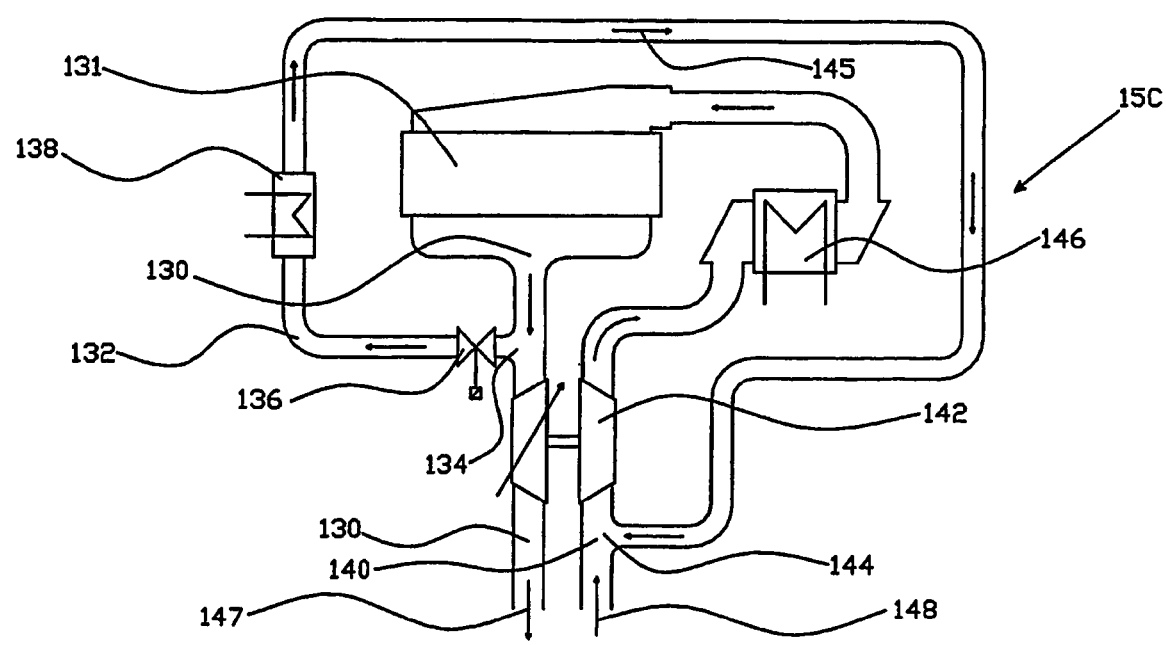
FIG. 7 is a schematic of an apparatus for utilizing EGR with a stratified gaseous combustion engine according to a third embodiment of the invention.

FIG. 7 shows an EGR system 15C according to a third embodiment of the invention. In the embodiment of FIG. 7, recirculated exhaust gases are mixed with fresh intake air upstream from a turbocharger compressor.

Exhaust line 130 is connected to carry exhaust gases away from combustion chambers in engine block 131. EGR line 132 branches off of exhaust line 130 at EGR junction 134. EGR valve 136 and EGR cooler 138 are both disposed in EGR line 132. EGR line 132 joins into intake line 140 at an intake junction 144 upstream of a fixed or variable geometry turbocharger 142. An intake charge cooler 146 is located in intake line 140 downstream from the compressor of turbocharger 142. Downstream from intake charge cooler 146, intake line 140 is connected to deliver intake air to each combustion chamber disposed within engine block 131.

EGR flow direction 145, exhaust flow direction 147 and intake air flow direction 148 are all shown.

In the embodiment of FIG. 7, exhaust gas from any of a number of combustion chambers disposed in engine block 131 is directed through exhaust line 130. Valve 136 directs a quantity of exhaust gas through EGR line 132 and cooler 138. The recirculated exhaust gas is then introduced back into intake line 140 at junction 144. The gas is then compressed by turbocharger 142. Excess heating of the intake charge as it is compressed by turbocharger 142 is managed by passing the intake charge through cooler 146 prior to introducing the intake charge into engine block 131 where it is routed to any of a number of combustion chambers.

As EGR is passed through charge cooler 146, cooler 138 may be not be necessary potentially reducing the complexity and cost of the system. Further, turbocharger 142 can be used to compress both intake air and EGR providing a means of increasing the concentration of EGR. If the turbocharger is upstream of junction 144, as was the case with the first two embodiments, it can be relatively more difficult to force EGR into a compressed quantity of intake charge than is the case where the intake air has yet been compressed. This is possible without particulate filters in light of the fuel used and the resulting exhaust gases being relatively free of particulates, which reduces complexity and cost.

Figure 8:
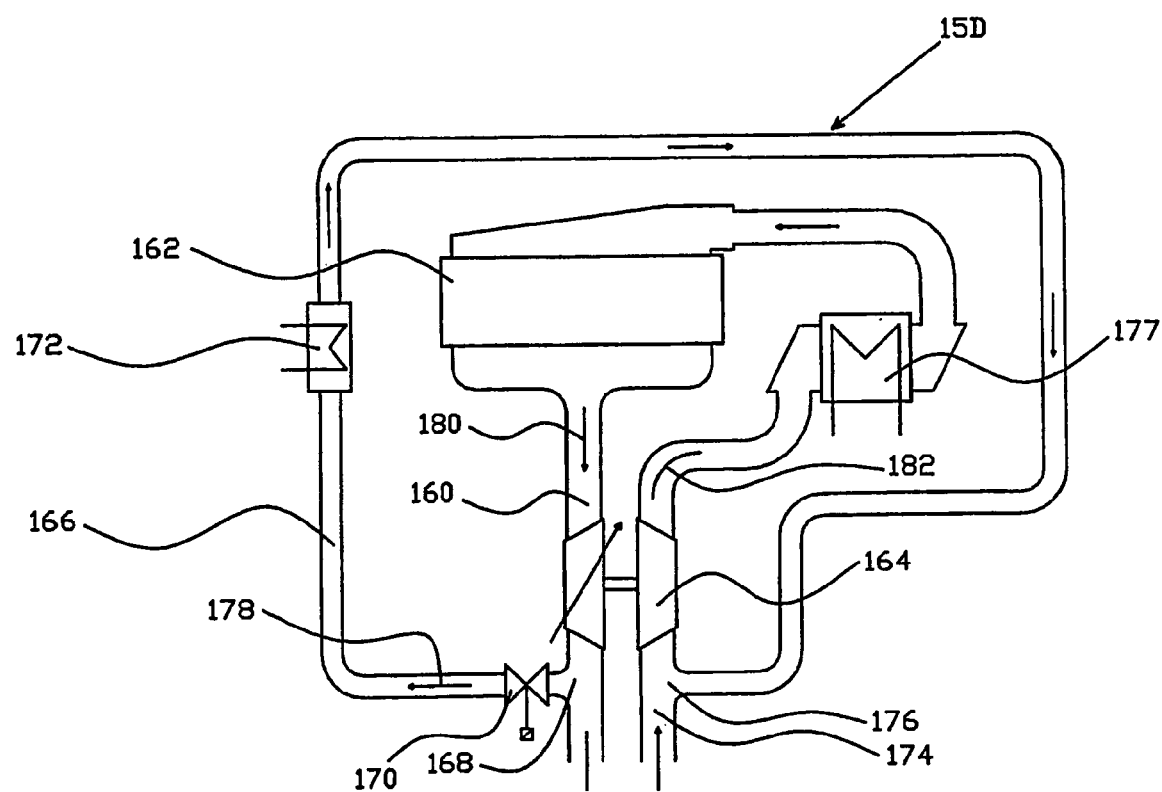
FIG. 8 is a schematic of an apparatus for utilizing EGR with a stratified gaseous combustion engine according to a fourth embodiment of the invention.

FIG. 8 shows EGR system 15D according to a further embodiment of the invention. In the embodiment of FIG. 8, exhaust gases are collected for recirculation at a point 168 downstream from a turbine of a fixed or variable geometry turbocharger 164. Exhaust line 160 carries exhaust gases from engine block 162 and through turbocharger 164 before meeting with EGR line 166 at junction 168. EGR valve 170 is disposed in EGR line 166. EGR cooler 172 is disposed in EGR line 166.

EGR line 166 meets with intake line 174 at intake junction 176, which is upstream of turbocharger 164. Intake charge cooler 177 is disposed in intake line 174 upstream from engine block 162.

EGR flow direction 178, exhaust flow direction 180 and intake air flow direction 182 are all shown.

In the embodiment of FIG. 8, exhaust gas is directed through turbocharger 164 after which valve 170, if open, allows a quantity of exhaust gas to be recirculated through EGR line 178. This configuration allows all exhaust gas expelled from the engine block to be used to drive turbocharger 164 resulting in greater recovery of exhaust gas energy. Moreover, as exhaust gas has expanded and therefore cooled in passing through the turbine of turbocharger 164, less cooling is required from cooler 172 and/or cooler 177.

Figure 9:
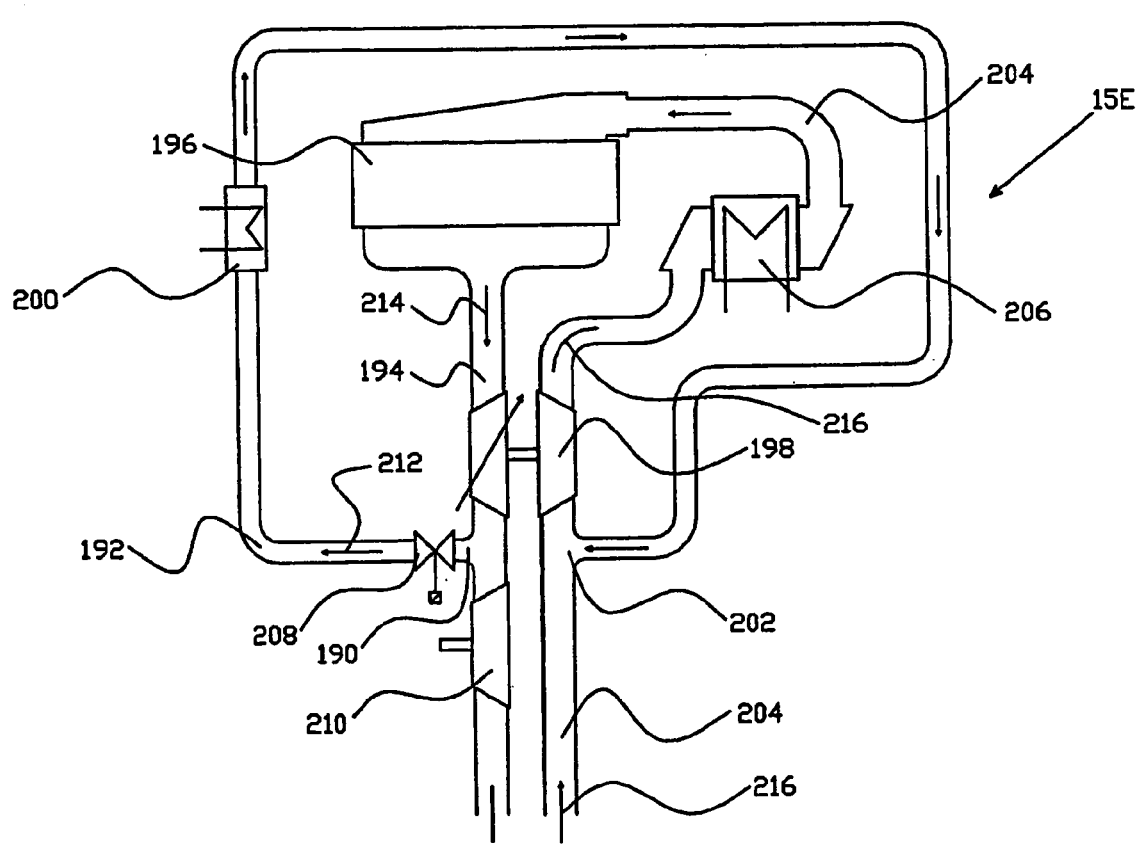
FIG. 9 is a schematic of an apparatus for utilizing EGR with a stratified gaseous combustion engine according to a fifth embodiment of the invention.

FIG. 9 shows an EGR system 15 E according to a fifth embodiment of the invention. The embodiment of FIG. 9 includes a power turbine 210 in an exhaust line 194 downstream from a turbocharger 198. An EGR line 192 connects to exhaust line 194 at an EGR junction 190. EGR cooler 200, intake junction 202 and intake line 204 are provided. An EGR valve 208 regulates the flow of exhaust gases through EGR line 192.

An intake charge cooler 206 is connected downstream of the compressor portion of turbocharger 198 in intake line 204. Also, in this embodiment, power turbine 210 is provided.

EGR flow direction 212, exhaust flow direction 214 and intake air flow direction 216 are shown.

Power turbine 210 allows for additional turbine energy to be provided following extraction of exhaust gas for EGR at junction 190. Power turbine 210 causes backpressure at junction 190. This helps to drive exhaust gases through EGR line 192. A power turbine could also be provided in other embodiments of the invention. For example, a power turbine could be incorporated into the embodiments of any of FIGS. 5A through 8.

Figure 10:
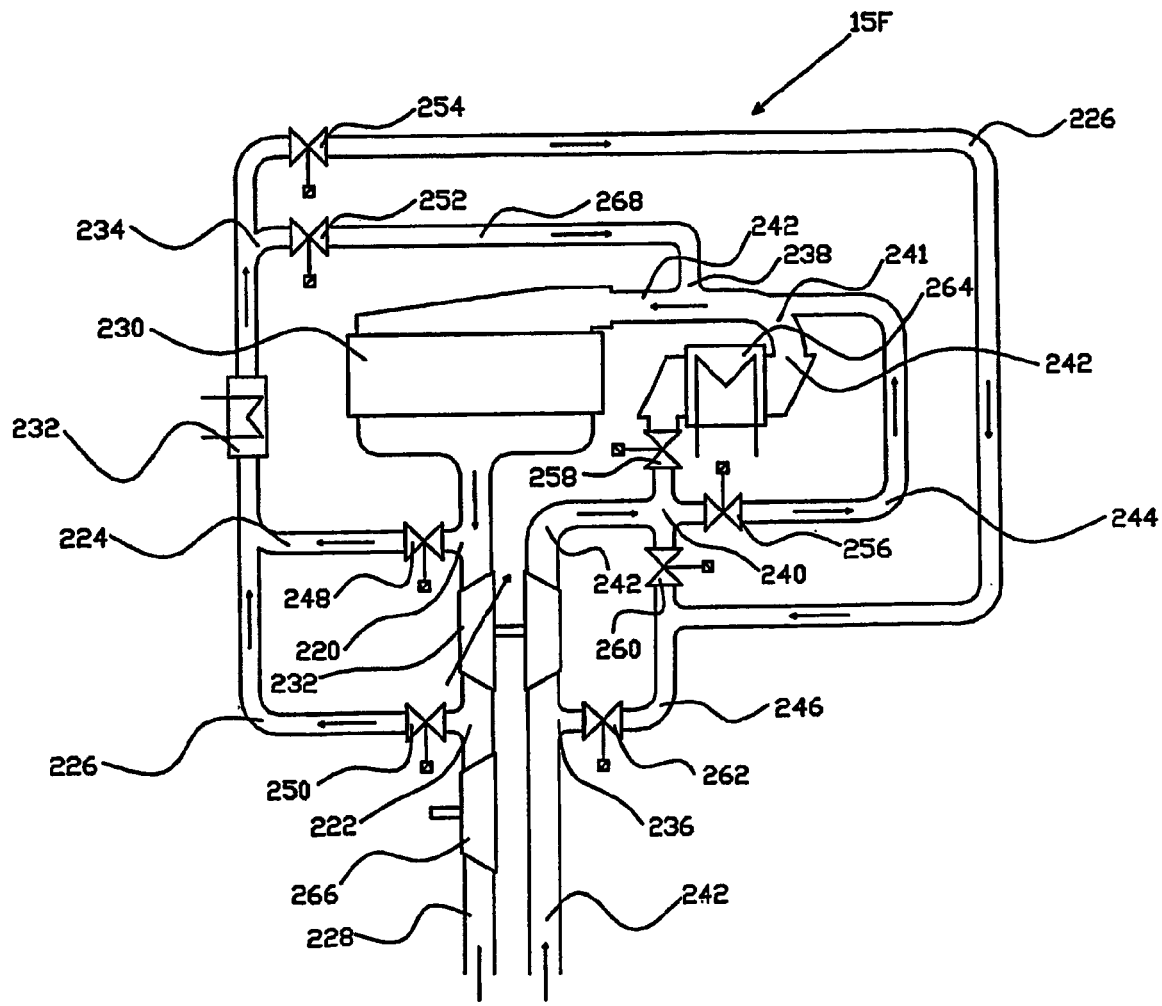
FIG. 10 is a schematic of an integrated apparatus for utilizing EGR with a stratified gaseous combustion engine according to a sixth embodiment of the invention.

FIG. 10 shows integrated EGR system 15F according to another embodiment of the invention. System 15F combines features of the above described embodiments. The embodiment of FIG. 10 has two EGR junctions 220,222 which connect EGR subline 224 and EGR main line 226 to exhaust line 228. Exhaust line 228 carries exhaust gases from combustion chambers in engine block 230. The turbine portion of a turbocharger 232 is disposed in exhaust line 228 between EGR junctions 220 and 222. EGR cooler 232, EGR branch junction 234, intake junctions 236,238, 240,241 and intake line 242 are provided. Cooler bypass line 244 and turbocharger bypass line 246 are also shown. Disposed throughout the system as well are subline valve 248, EGR valve 250, EGR direct valve 252, and EGR cooler valve 254. Also, charge cooler bypass valve 256, cooler valve 258, and turbocharger valves 260,262 are shown. Disposed in intake line 240 is charger cooler 264. Within exhaust line 228 is power turbine 266 is provided. EGR direct line 268 is also shown.

The EGR system of FIG. 10 can be configured to operate according to various EGR strategies by opening and closing different combinations of valves 248, 250, 252, 254, 256, 258, 260 and 262. The operation of the EGR system can thereby be adjusted to suit the conditions under which engine 230 is operating from time to time.

Valves 248 and 250 direct EGR from exhaust line 228 into either EGR subline 224 or main line 226. By adjusting valves 248 and 250, exhaust gases can be drawn off for EGR either upstream or downstream from the turbine of turbocharger 232 or both. EGR can be shut off by closing both of valves 248 and 250. A controller may control valves 248 and 250 in response to various parameters including the demands of turbocharger 232 or power turbine 266.

System 15F can introduce recirculating exhaust gases at any or all of: downstream from intake charge cooler 264 by way of valve 252 and EGR direct line 268; upstream from intake charge cooler 264 but downstream from the compressor of turbocharger 232 by way of valve 254, EGR main line 226 and valve 260; or upstream from the compressor of turbocharger 232 by way of valve 254, EGR main line 226 and valve 262.

A controller controls valves 252, 254, 260 and 262 to introduce recirculated exhaust gases at a location appropriate to the operational needs of engine 230.

Also, in each case where the various valves found in this embodiment are found, they can be used to create variable flow through any number of valves at the same time to provide an EGR system according to the need of the engine as a whole as set out in regards to each embodiment set out in FIGS. 5 through 9. Further, any alternate EGR or intake routing, could be removed reducing performance options where such options may be of limited value or difficult to accommodate for the application at issue. For example, fewer options may be able to be accommodated in applications where space is limited. This may not be the case for stationary power generation.

Further, providing more flexibility on the configuration of an EGR system may be desirable where engine performance is constantly varying-that is, where transients are common. In such applications, reaction time to transients may be managed by a variety of EGR configurations in light of the interrelationship between EGR level, combustion efficiency and turbocharger control.

Note that there may be a need for additional components within the EGR routing embodiments considered in FIGS. 5 through 10. That is, depending upon the application and the specific components used, there may be significant pressure and temperature differences across components of the system that may require additional pumping or venturi apparatuses to direct flow across the various junctions found in the embodiments considered. By way of example, in the embodiment of FIG. 6, there may be a need to introduce a venturi or pump to force recirculating exhaust gases from EGR line 98 across junction 106 to mix with intake air drawn into intake line 104 prior to turbocharger 110. That is, there may be a pressure difference between EGR line 98 upstream of cooler 102 and intake line 104 after turbocharger 110 prior to junction 106. Likewise, management of the EGR system contemplated in FIG. 10 contemplates the use of a pump or venturi where necessary should there be a requirement to manage flow across any one of junctions 220, 222, 234, 236, 238, 240 and 241. Again, by way of example, should there be a desire to cause a percentage of overall EGR to be pulled from exhaust gas prior to turbocharger 232 and a percentage after turbocharger 232, at junctions 220 and 222 respectively, then it is likely a mixing method would need to be introduced into the systems as would be understood by a person skilled in the art. That is, the pressure of exhaust gas at junction 222 would likely be less than the pressure at junction 220 in light of turbocharger 232 disposed between each junction causing exhaust gas across the turbocharger to expand. Therefore, such a pressure difference would need to be managed in order to allow mixing of each stream.

Where EGR is introduced through any of the coolers demonstrated or the turbochargers found in the previously described embodiments, there is generally no need for any kind of filtration to manage particulate matter within the EGR stream as the gaseous fuel combustion contemplated generates little particulate matter. As such, greater flexibility is available for managing EGR compared to a diesel-fuelled equivalent. As noted above, the capability to pull an EGR stream from the exhaust gas after the turbine, before the compressor and before either the main coolers found in the intake line or the EGR cooler found in the EGR line with little or no treatment of particulates can be advantageous. Further, combinations of these systems may be incorporated to help adapt the EGR system to the combustion strategy utilized in the combustion chamber. This flexibility without particulate filters is not generally available to diesel fuelled compression ignition engines as particulates within the intake line are almost always a concern.

In some applications an oxidizing catalyst may be provided to reduce the concentration of volatile compounds in the exhaust, thereby avoiding build-up of sticky deposits within the EGR and intake system.

In the embodiments shown in FIGS. 5 through 10, a cooler 76, 102, 138 and 172 is provided in EGR line 74 however, this cooler may be eliminated such that cooling of the EGR stream can either be directly effected when directed through coolers 108, 146 and 177 or indirectly when the EGR stream is mixed with a quantity of intake air.

Figure 11A:
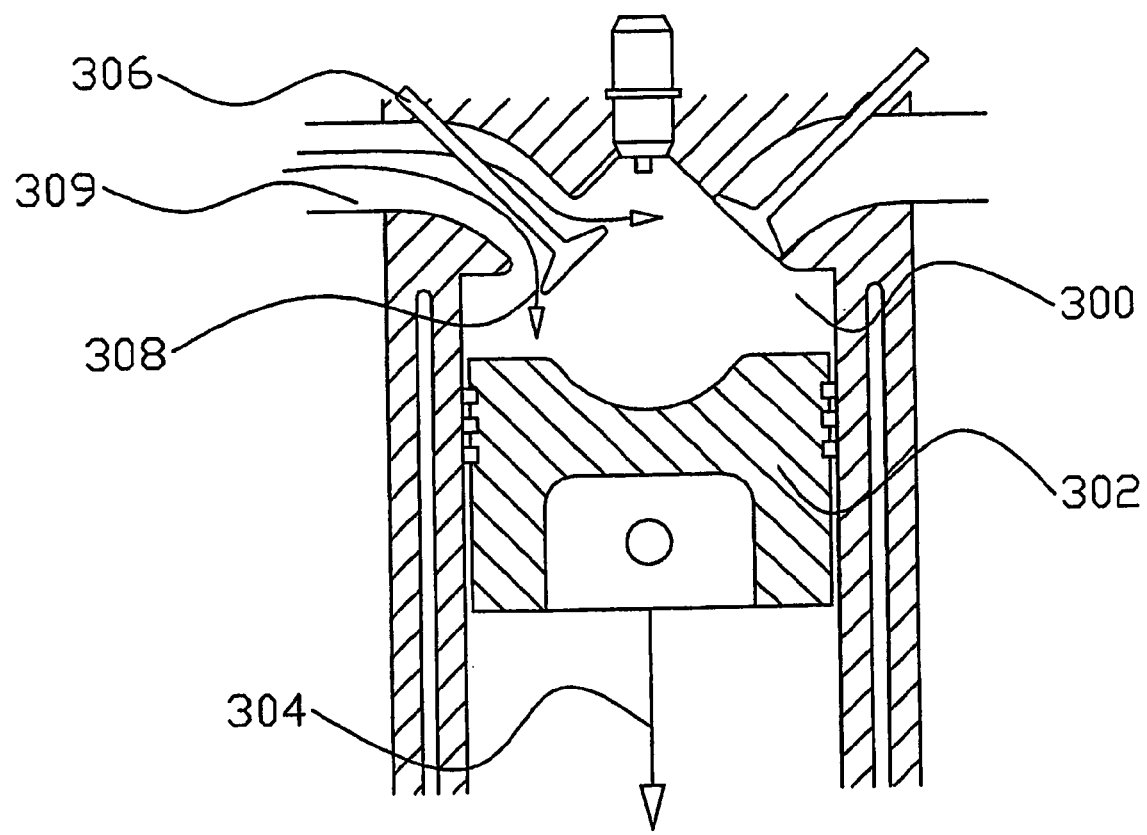
FIGS. 11A through 11F are respectively cross sections of a combustion chamber demonstrating internal EGR utilized in a stratified gaseous combustion engine at different phases of an operating cycle.
Figure 11B:
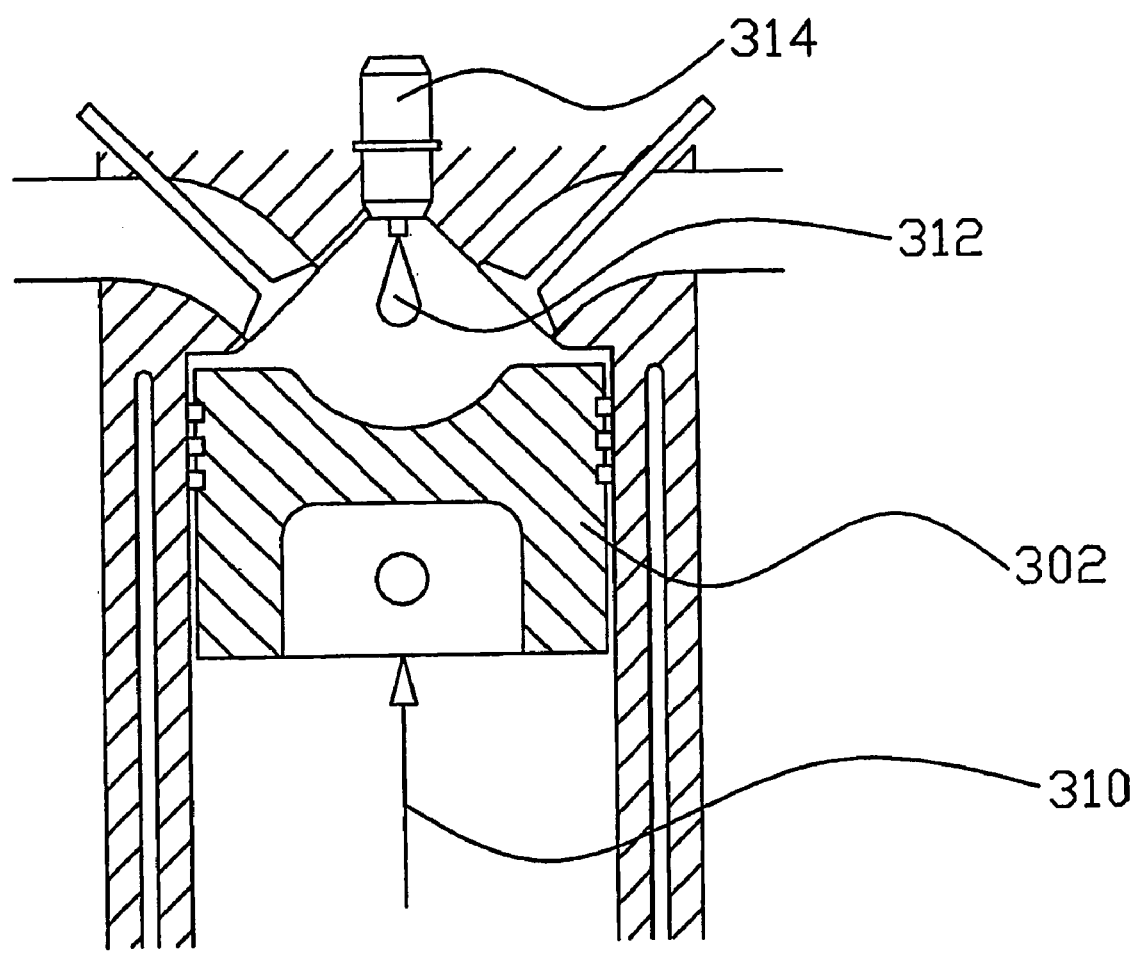
Figure 11C:
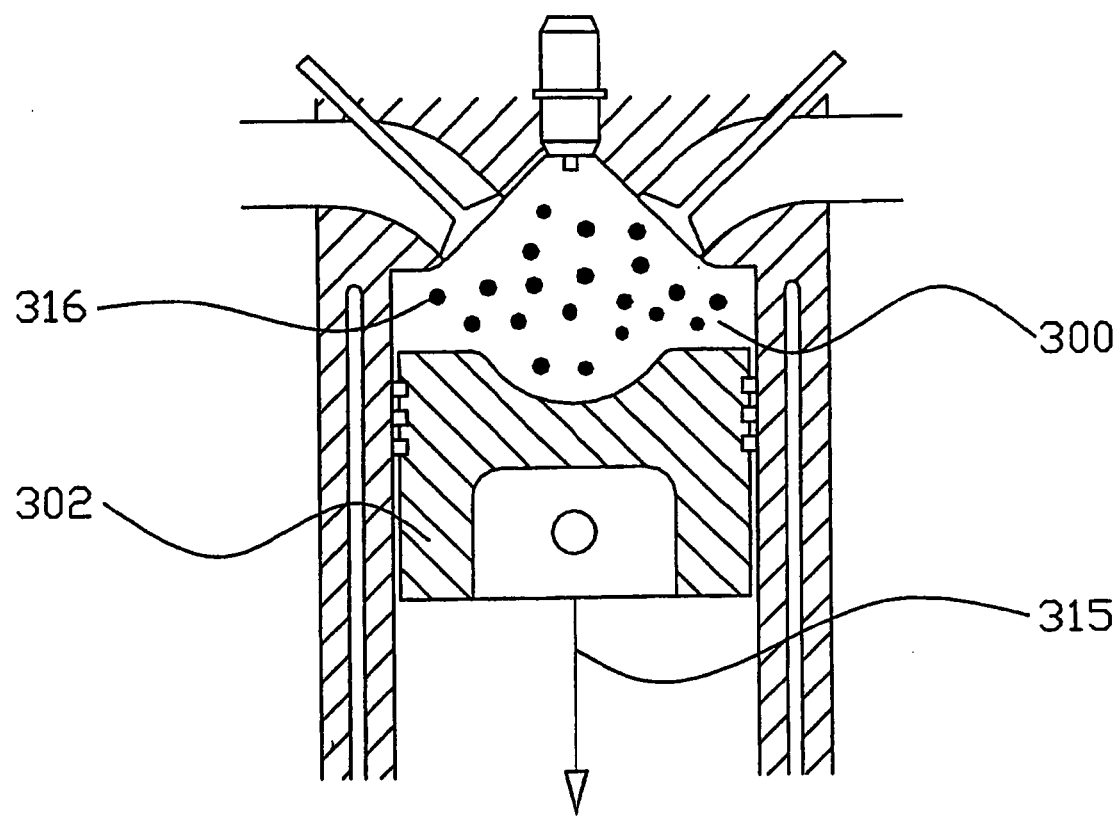
Figure 11D:
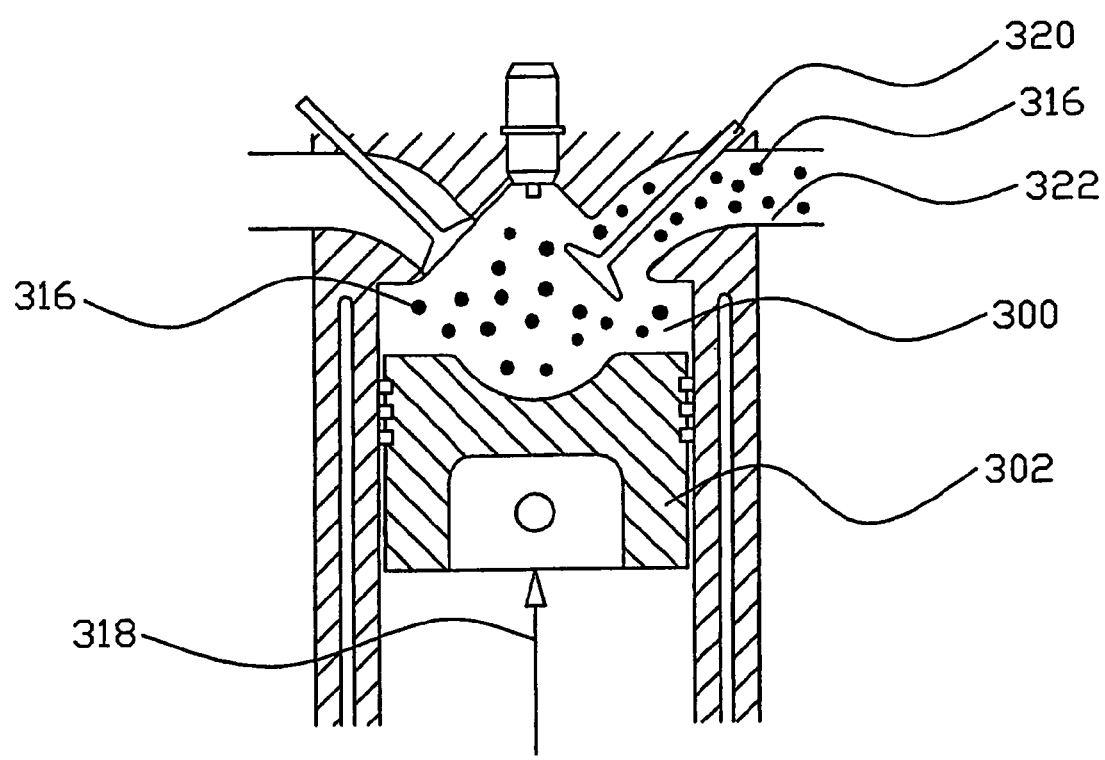
Figure 11E:
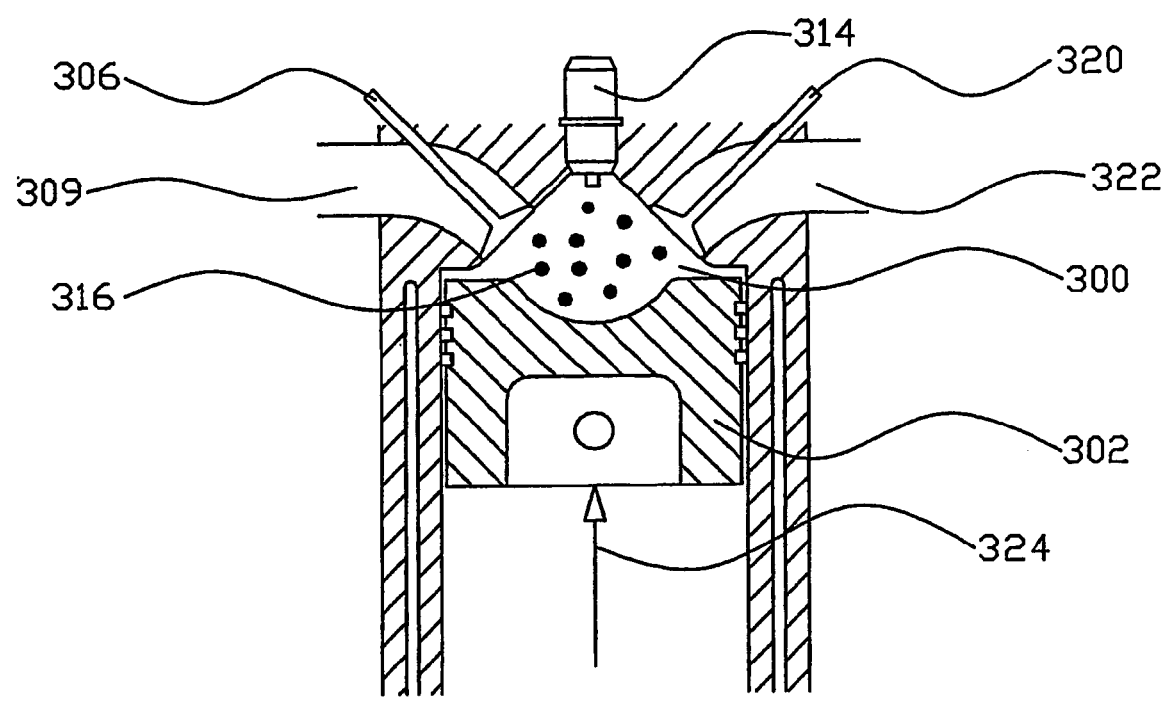
Figure 11F:
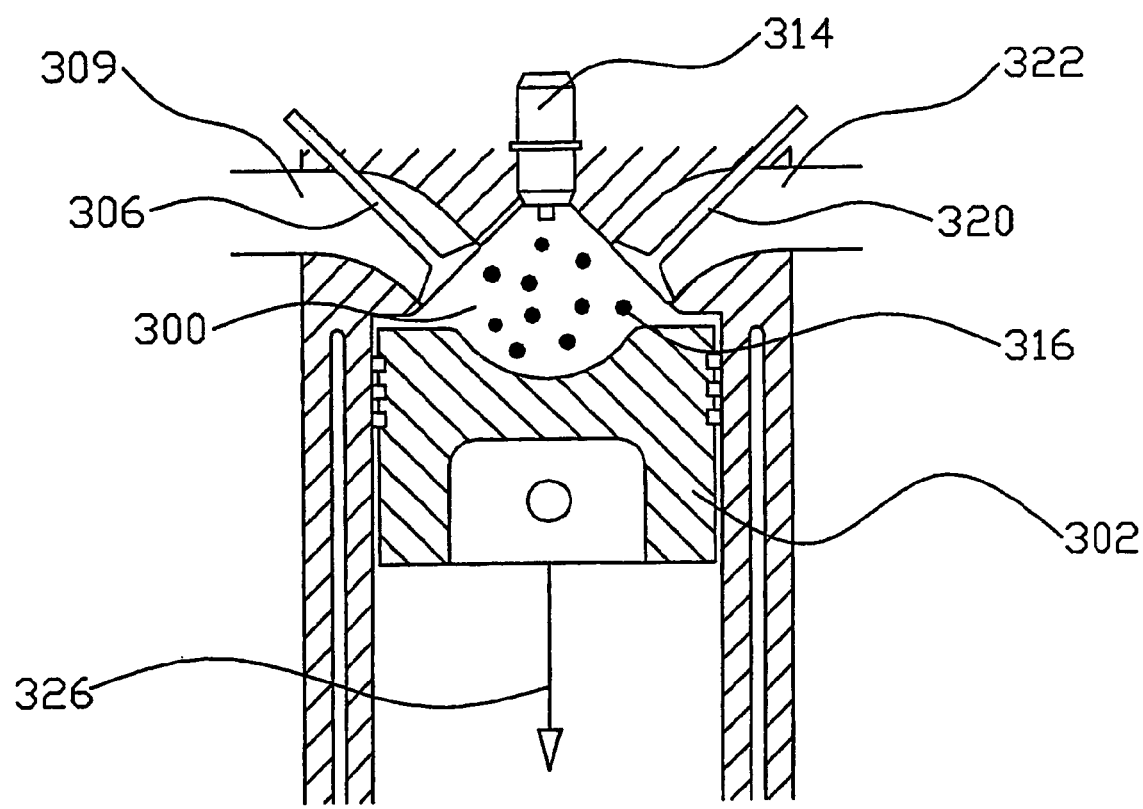

FIGS. 11A through 11F show yet another embodiment of the invention. FIG. 11A shows combustion chamber 300 with piston 302 moving in direction 304. Intake valve 306 is shown along with intake air 308 flowing through intake line 309. FIG. 11B shows piston 302 moving in the direction 310. Gaseous fuel 312 and injector 314 are provided. In FIG. 11C, piston 302 is moving in direction 315. Exhaust gas 316 is shown within combustion chamber 300. FIG. 11D shows piston 302 moving in direction 318. Exhaust gas 316 is provided as is exhaust valve 320 and exhaust line 322. FIG. 11E shows exhaust gas within combustion chamber 300 while piston 302 is moving in direction 324. Finally, FIG. 11F shows piston 302 moving in direction 326.

FIG. 11 demonstrates the utilization of internal EGR where directly injected gaseous fuel is used to drive the piston. FIG. 11A shows an initial intake stroke where piston 302, moving in direction 304, draws intake air 308 past intake valve 306 into combustion chamber 300.

Upon completion of the intake stroke, compression stroke commences wherein, referring to FIG. 11B, piston 302 moving in direction 310 compresses the intake air. Near completion of the intake stroke, gaseous fuel 312 is injected into combustion chamber 300. This may also occur at the completion of the compression stroke or upon commencement of the power stroke. Gaseous fuel 312 then burns driving the piston in direction 315 (see FIG. 11C). Upon completion of combustion of the gaseous fuel, exhaust gas 316 remains within combustion chamber 300.

Following the power stroke, the exhaust stroke is commenced wherein piston 302 moves in direction 318 and exhaust valve 320 is opened (see FIG. 11D). A quantity of exhaust gas 316 is driven from combustion chamber 300 and into exhaust line 322. However, in the embodiment discussed, exhaust valve 320 is closed prior to completion of the exhaust stroke, while piston 302 is still traveling in direction 324 (see FIG. 111E). As such, a quantity of exhaust gas 316 is trapped in combustion chamber 300.

Referring to FIG. 11F, a subsequent intake stroke is commenced wherein piston 302 is moving in direction 326. However, during this cycle, intake valve 306 is closed at the commencement of the intake stroke. Referring to FIG. 11A again, a subsequent cycle is continued wherein intake valve 306 is opened allowing intake air 308 into the combustion chamber. In general, during this intake stroke the intake valve is closed for a period that may be is determined with reference to the quantity of exhaust gas retained in the combustion chamber during the exhaust stroke. That is, the desired charge is determined by a measure of the initial exhaust gas left in the combustion chamber at the completion of the exhaust stroke plus addition air required to make up the total charge.

Note, as long as the valve is closed for a period during the intake and exhaust strokes, the requisite internal EGR requirements should be met. These valves are not necessarily opened or closed at the commencement of the intake stroke and completion of the exhaust stroke as shown in the embodiment considered in FIGS. 11A to 11F.

Most diesel engines rely on charge motion (by way of example, swirl and squish) generated by the intake process to assist in mixing of diesel fuel with charge air and combustion products during the combustion process. The primary reason for this is control of particulate matter. As particulate matter is not as significant a concern in a gaseous-fuelled engine, control of charge motion generated during the intake process is not of primary concern. The internal EGR process outlined in FIGS. 11A to 11F will result in variable air motion as a by-product of EGR rate. When a high EGR rate is used, less charge will be drawn into the cylinder through intake valve 306 and less charge motion will be generated. Correspondingly, when a lower EGR rate is used, more charge motion is generated. In a diesel-fuelled engine, this needs to be managed as the particulate emission would be adversely affected by changes of charge motion as EGR rate is varied. More flexibility is provided as air motion is not required to the same extent in a gaseous-fuelled engine. Typically, internal EGR utilizing directly injected gaseous fuel combustion can tolerate higher EGR levels than diesel fuelled combustion. As there is little particulate matter generated using internal EGR, there is limited concern regarding variable charge motion within the combustion chamber. Although particulate filters can be used to reduce particulate from the tailpipe, particulates generated during combustion must be controlled to prevent premature engine wear, oil contamination (resulting in high oil change frequency) and high particulate filter loading (resulting in efficiency loss due to back pressure or excessive forced regeneration frequency).

Generally, EGR strategies are flexible with directly injected gaseous fuel. As injection timing can be manipulated based on the intake charge, this variable can be utilized to manage EGR levels. Timing, in this context, would include strategies that introduce multiple injections and therefore introduce multiple start of injection times during each cycle. Further, injection duration can be used to help adapt combustion efficiency to EGR levels used in light of engine operating conditions. In general, very short injection duration allows for quicker heat release and, consequently lower exhaust temperature directed into the exhaust line of any one of the embodiments discussed above. Also, injection duration and, consequently, heat release can be lengthened. This provides for hotter exhaust gas as required. Rate shaping of the injection pulse results in variations in duration for the same quantity of fuel. This adaptation strategy to manage EGR is included for the purposes of this application when contemplating duration changes to meet EGR levels under a set of engine operating conditions. The ability to adapt injection duration and timing provides two variables that allow a given combustion event to be managed in light of a variety of possible charge conditions. This allows a controller to adapt to changing EGR levels through a variety of engine applications and transient conditions in order to manage combustion efficiency.

For the embodiments discussed above, controls related to EGR used in a gaseous-fuelled internal combustion engine need not be complicated by particulate management strategies.

By way of example, EGR levels tolerated by a high pressure direct injection of natural gas can range to 70% depending on engine operating parameters and tolerated emissions. That is, up to 70% of intake charge can be EGR In this disclosure and the appended claims, a point "near top dead center" is any point wherein the piston is within 30 degrees of top dead center as measured in crank shaft rotations.

Figure 12:
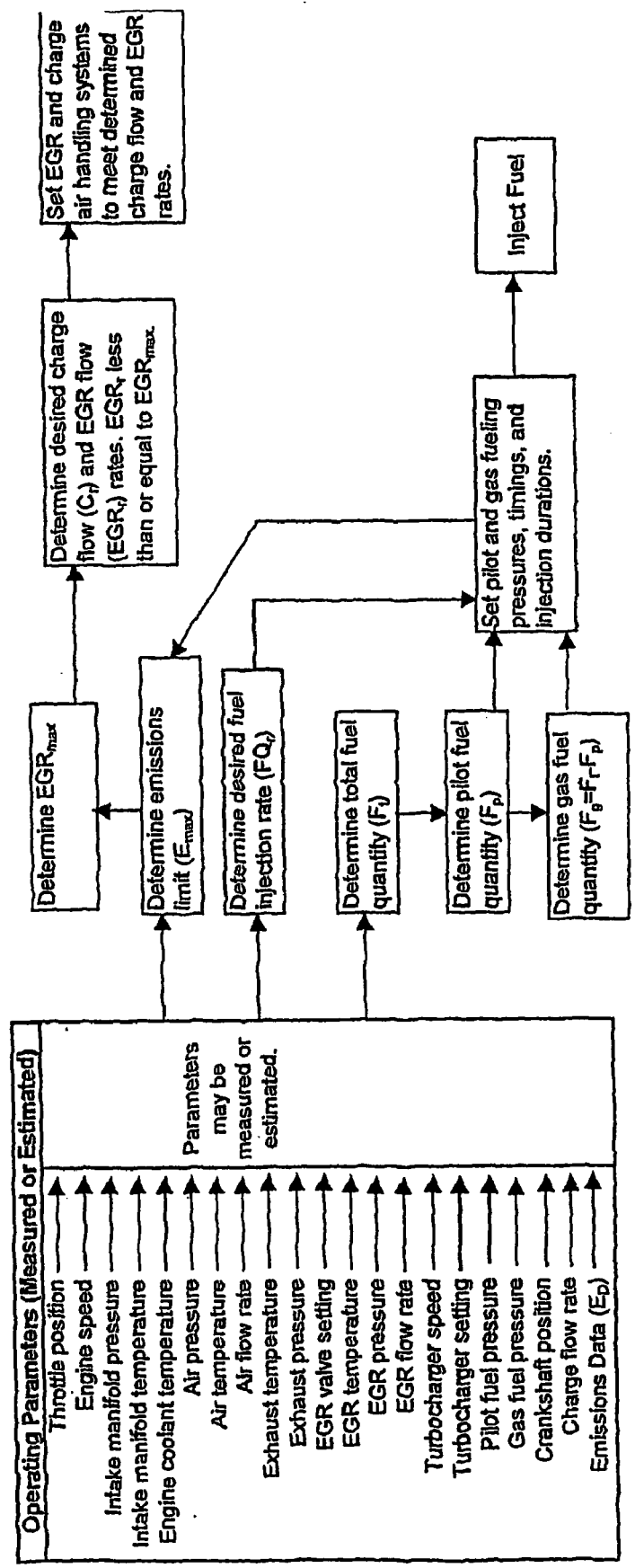
FIGS. 12 and 13 are flow charts illustrating the operation of EGR control system.
Figure 13:
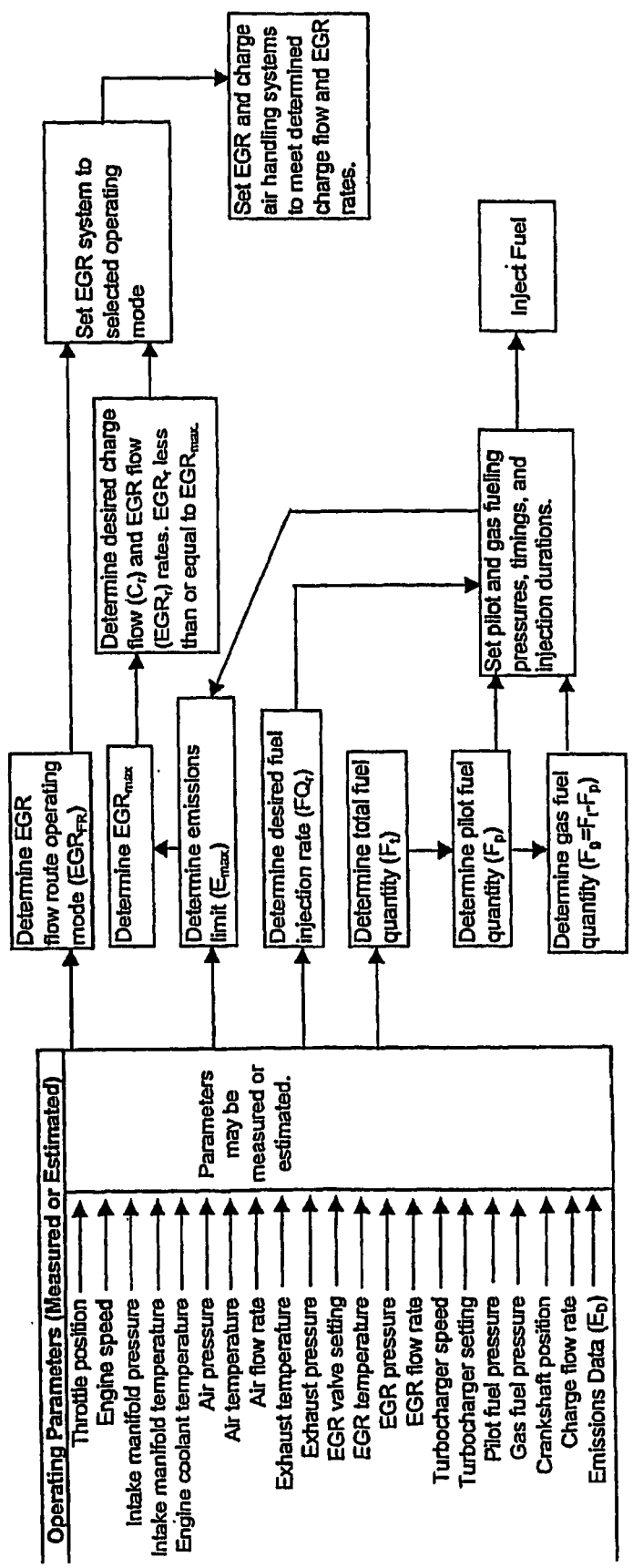

FIGS. 12 and 13 are control logic diagrams that depict the logic that an electronic control unit ("ECU") may be programmed to follow to direct an EGR system according to this invention. An ECU of the type used to control a gaseous-fuelled engine that benefits from a pilot charge to help ignite the gaseous fuel may be used. However, hot surface and other ignition strategies can be adapted to control EGR strategies, as would be understood by a person skilled in the art.

In general, the ECU in the present invention is able to set the EGR level based on, amongst other things, a threshold that is equal to the maximum emissions tolerated out of the engine. As is the case with the combustion strategy of high pressure directly injected gaseous fuels, the emissions limits are dictated by:

CO concentration hydrocarbons concentrations, or a combination of any two or all three of CO, hydrocarbons and particulates.

Therefore, these emissions levels can be monitored and the EGR adjusted to ensure the EGR is utilized to meet engine requirements up to the emissions levels in question.

The ECU, in the embodiments considered in FIGS. 12 and 13, uses a series of input parameters, including throttle, engine speed, intake manifold temperature, EGR pressure and flow, gas pressure, as well as estimated or directly measured emissions data ($E_D$). Such input parameters are used to determine, amongst other things, the following control parameters-desired fuel injection rate ($FQ_r$), fuel quantity ($F_t$), pilot fuel quantity ($F_p$) and gas fuel quantity ($F_g$). The pilot and gas fueling pressures, timings and injection durations are then determined and used, along with the engine parameters, to determine emissions limit ($E_{max}$). $E_{max}$ is then used to determine a maximum EGR level ($EGR_r$) for the operating parameters and fueling strategy. This in turn is used to set the EGR rate ($EGR_r$) and charge flow rate ($C_r$) as well as a combined intake flow ($I_r=EGR_{max}+C_r$) which provide a basis for determining the $EGR_r$ determined as an operating parameter for subsequent cycles.

In FIG. 13, additionally, where EGR strategies include more than just adjustment of flow rates and the quantity as described in, by way of example, the embodiment referred to in FIG. 10 an EGR flow routing ($EGR_{fr}$) is incorporated.

In general, fuel demands are initially set to meet a desired speed and load demand. The resulting operating parameters arising from such demand are used, as demonstrated, to set a pilot and main fuel injection timing, pressure and duration. These desired parameters are utilized to provide an actual pilot and main fuel injection strategy which, in turn is used by the ECU, taking engine operating parameters into consideration, to determine for a given engine operating conditions an $E_{max}$. $E_{max}$ is one or a combination of:

CO concentration, hydrocarbons (HC) concentration,

CO plus HC concentration

CO plus particulates concentration,

HC plus particulates concentration, and

CO plus HC plus particulates concentration.

$E_{max}$ is then used with the engine operating parameters to determine $EGR_{max}$, the set point for a given operating condition. This set point should be approximately equal to the measured or estimated EGR rate for the operational parameters utilized that would result in an estimated or measured $E_{max}$. The set point is then used to control $EGR_r$ at some level equal to or less than the set point, $EGR_{max}$. The set point is found from bench tests or look-up tables for a given $E_{max}$ delivered under a set of operating conditions. This is based on $E_D$ data collected for a given $EGR_r$. While this data, $E_D$ for a given $EGR_r$ under given operating conditions, can be collected and programmed into the ECU, it can also be directly measured or estimated during operation to derive $EGR_{max}$. The directly measured or estimated level correlate to the emissions considered by the ECU Similarly, after determining an $E_{max}$ for a given set of operating parameters, $EGR_r$ may be adjusted by comparing the emissions concentration from $E_D$, and, where this concentration exceeds $E_{max}$, reducing $EGR_r$ from a predetermined, initial or previous cycle level until the level results in acceptable emissions. Again the emissions of interest are:

CO concentration,
hydrocarbons (HC) concentration,
CO plus HC concentration,
CO plus particulates concentration,
HC plus particulates concentration, and
CO plus HC plus particulates concentration.

While the ECU capitalizes on the rate limiting emission (based on CO and HC), which would generally manage EGR levels, as CO and HC are relatively easy to manage, aftertreatment systems may be incorporated to allow for relatively high CO and HC concentrations out of the combustion chamber. In this circumstance with CO and HC aftertreatment, maximum EGR levels may be set by combustion stability. Known techniques to ensure combustion stability such as monitoring the coefficient of variation (COV) could be used in conjunction with such aftertreatment system to set maximum EGR levels.

There may be an open loop component to the strategy to the extent that $EGR_r$ is utilized as one operating parameter to help determine fueling strategies.

Referring to FIG. 13, $EGR_{fr}$ is initially determined based on engine parameters such as, by way of example, load requirements, engine speed and ambient conditions. Once the flow route is determined and selected, the ECU will carry on to determine, as noted above, a fueling strategy and $EGR_r$ where additional steps follow the same logic as set out for the embodiment found in FIG. 12.

As noted above, the ECU utilizes operating parameters to control EGR levels, including maximum levels of EGR, that may be based on or directly consult.

look-up tables
results of stored bench tests
mathematical models that utilize any one of a number of engine operating parameters, or
direct measurement.

$EGR_r$ and, consequently $I_r$ need to be controlled in light of $F_t$ to meet operator demands as noted above. However, as mentioned above, one of the main considerations limiting and, therefore, helping to dictate $E_r$ is certain emissions resulting from the combustion processes discussed. For natural gas, directly injected, depending on the aftertreatment solutions employed, CO and HC emissions will limit EGR levels or concentrations of exhaust gas into the intake line. By way of example, a maximum EGR level may be set, in part, by a look-up table or the results of stored bench tests, that correlate a given EGR level under various operating conditions to a maximum tolerable emission concentration within the exhaust gas. Such look-up tables or bench test results determine the maximum EGR level for a given set of operating parameters and ensure that EGR levels introduced in light of operator demand do not exceed the maximum found in the corresponding benchmark data or are adjust to meet those emissions levels.

By way of example, a CO level of 3800 ppm is a typical upper limit on CO emissions for trucking applications under many load conditions. This is only one example. In fact, emissions limits may also vary as load conditions vary as noted in the embodiment for the ECU discussed above.

As well, as noted above, the emissions in the exhaust can be directly measured and the maximum EGR level set based on an initial EGR level or levels arising from those used and averaged prior to the measured emissions. If the emissions level is found to exceed a range determined to be beyond a maximum emissions concentration, the maximum EGR level can be reduced eventually bringing the level to a value below the emissions range. The set point is then determined for that operating condition of the engine. Again, emissions are considered in light of the CO or HC emissions produced during combustion as these emissions are more sensitive to increases in EGR levels utilizing the subject invention.

The same control mechanism is used for internal EGR where the exhaust valve is closed based after a desire amount of exhaust gas is retained. The ECU here will however, vary the timing of the exhaust valve and the intake valve where the maximum EGR level is set by emissions considerations noted above.

In general, additional control strategies beyond the embodiments considered above should limit EGR levels based on a maximum CO and/or HC emissions level and the EGR rate-limiting factor.

While the above embodiments are discussed in the context of a four-stroke engine, the embodiment can be adapted to two-stroke engines. That is, while two-stroke embodiments would encompass an existing EGR level in light of additional exhaust gas retained within the combustion chamber between each cycle, this amount need only be considered by the ECU when determining the desired amount of EGR. Other, than this, the strategies discussed above are equally applicable.

While natural gas is generally be discussed in this disclosure, other gaseous fuels are equally adaptable to the benefits of the subject invention where such fuels are not prone to the creation of particulates when compared to diesel fuel. By way of example, hydrogen, and gaseous hydrocarbons such as propane and methane are considered and may be adapted. Also, gaseous fuels (e.g., methane) mixed with fuel additives to improve ignition and combustion characteristics may be adapted and are considered where gaseous fuels are discussed generally.

While particular elements, embodiments and applications of the present invention have been shown and described, it will be understood, of course, that the invention is not limited thereto since modifications may be made by those skilled in the art without departing from the scope of the present disclosure, particularly in light of the foregoing teachings.

What is claimed is:

1. A method of operating a gaseous-fuelled internal combustion engine, said method comprising:
   during a cycle of said engine:
   (a) directing an intake charge from an intake line into a combustion chamber of said internal combustion engine,
   (b) compressing said intake charge within said combustion chamber,
   (c) injecting a directly injected gaseous fuel into said compressed intake charge within said combustion chamber at a pressure above 12 MPa,
   (d) igniting said directly injected gaseous fuel,
   (e) burning said directly injected gaseous fuel,
   (f) directing exhaust gas produced during burning of said directly injected gaseous fuel from said combustion chamber into an exhaust line, wherein a quantity of said exhaust gas from said exhaust line is directed through an EGR line to said intake line and, during a subsequent cycle of said engine, a subsequent intake charge comprises said quantity of said exhaust gas; and wherein said quantity of said exhaust gas is dependent on at least one of: (1) a target NOx concentration resulting from burning said directly injected gaseous fuel, and (2) said pressure.

2. The method of claim 1 wherein said pressure is dependent on said quantity of said exhaust gas.

3. The method of claim 1 further comprising injecting said directly injected gaseous fuel for a predetermined duration, said predetermined duration dependent on said quantity of said exhaust gas.

4. The method of claim 1 further comprising injecting said directly injected gaseous fuel for a predetermined timing, said predetermined timing dependent on said quantity of said exhaust gas.

5. The method of claim 1 further comprising commencing injection of said gaseous fuel at between −20 and 5 degrees ATDC.

6. The method of claim 1 wherein said directly injected gaseous fuel is injected at a pressure below 30 MPa.

7. The method of claim 1 wherein said directly injected gaseous fuel burns in a stratified combustion mode.

8. The method of claim 7 further comprising promoting diffusion combustion of said directly injected gaseous fuel.

9. The method of claim 7 wherein said intake charge within said intake line is substantially free of a gaseous fuel.

10. The method of claim 7 wherein said intake charge is substantially free of a gaseous fuel prior to introduction of said directly injected gaseous fuel.

11. The method of claim 1 further comprising cooling said quantity of said exhaust gas prior to directing said quantity of said exhaust gas from said intake line into said combustion chamber.

12. The method of claim 1 further comprising compressing said quantity of said exhaust gas prior to directing said quantity of said exhaust gas from said intake line into said combustion chamber.

13. The method of claim 1 further comprising directing a remaining quantity of said exhaust gas through a turbine of a turbo-charger after said quantity of said exhaust gas is directed into said EGR line.

14. The method of claim 1 further comprising directing said exhaust gas through a turbine of a turbo-charger before said quantity of said exhaust gas is directed into said EGR line.

15. A method of operating a gaseous-fuelled internal combustion engine, said method comprising:
during a cycle of said engine:
(a) directing an intake charge from an intake line into a combustion chamber of said internal combustion engine,
(b) compressing said intake charge within said combustion chamber,
(c) injecting a directly injected gaseous fuel into said compressed intake charge within said combustion chamber at a pressure above 12 MPa,
(d) igniting said directly injected gaseous fuel,
(e) burning said directly injected gaseous fuel,
(f) directing exhaust gas produced during burning of said directly injected gaseous fuel from said combustion chamber into an exhaust line,
(g) determining an emissions concentration within said exhaust gas directed from said combustion chamber, said emissions concentration being the concentration of one of:
  (1) carbon monoxide,
  (2) hydrocarbons,
  (3) combined carbon monoxide and hydrocarbons,
  (4) combined carbon monoxide and particulates,
  (5) combined hydrocarbons and particulates, or
  (6) combined carbon monoxide, hydrocarbons and particulates,
(h) determining an EGR rate set point at which said emissions concentration exceeds a maximum emissions concentration,
(i) adjusting said quantity of said exhaust gas to provide an EGR level below said set point when said emissions concentration exceeds said maximum emissions concentration,
wherein a quantity of said exhaust gas from said exhaust line is directed through an EGR line to said intake line and, during a subsequent cycle of said engine, a subsequent intake charge comprises said quantity of said exhaust gas.

16. A method of operating an internal combustion engine, said method comprising:
during a cycle of said engine:
(a) directing an intake charge from an intake line into a combustion chamber of said internal combustion engine,
(b) compressing said intake charge,
(c) introducing a fuel into said intake charge within said combustion chamber,
(d) igniting said fuel,
(e) burning said fuel,
(f) directing exhaust gas generated by combustion of said fuel from said combustion chamber into an exhaust line;
(g) determining an emissions concentration within said exhaust gas, said emissions concentration being the concentration of one of:
  (1) carbon monoxide,
  (2) hydrocarbons,
  (3) combined carbon monoxide and hydrocarbons,
  (4) combined carbon monoxide and particulates,
  (5) combined hydrocarbons and particulates, or
  (6) combined carbon monoxide, hydrocarbons and particulates,
(h) determining an EGR level set point at which said emissions concentration equals or exceeds a maximum emissions concentration,
(i) determining a predetermined quantity of said exhaust gas to direct through an EGR line, said quantity of said exhaust gas providing an EGR level below said set point,
(j) directing a quantity of said exhaust gas based on said predetermined quantity of said exhaust gas to an EGR line to said intake line, wherein during a subsequent cycle of said engine, a subsequent intake charge comprises said quantity of said exhaust gas.

17. The method of claim 16 wherein said emissions concentration is determined from a look up table based on a set of engine operating parameters.

18. The method of claim 16 wherein said emissions concentration is determined by a mathematical model based on a set of engine operating parameters.

19. The method of claim 16 wherein said emissions concentration is determined by reference to bench tests.

20. The method of claim 16 wherein said emissions concentration is measured directly.

21. The method of claim 16 further comprising injecting said fuel directly into said combustion chamber.

22. The method of claim 21 further comprising injecting said fuel for a predetermined pressure, said predetermined pressure dependent on said quantity of said exhaust gas.

23. The method of claim 21 further comprising injecting said fuel for a predetermined duration, said predetermined duration dependent on said quantity of said exhaust gas.

24. The method of claim 21 further comprising injecting said directly injected gaseous fuel for a predetermined timing, said predetermined timing dependent on said quantity of said exhaust gas.

25. The method of claim 21 further comprising injecting said fuel into said combustion chamber when a piston disposed in a cylinder within said internal combustion engine is at or near top dead center.

26. The method of claim 21 wherein said fuel is a gaseous fuel.

27. The method of claim 16 wherein said fuel burns in a stratified combustion mode.

28. The method of claim 21 wherein said fuel burns in a stratified combustion mode.

29. The method of claim 21 wherein said fuel comprises natural gas.

30. The method of claim 16 wherein said fuel is a gaseous fuel.

31. The method of claim 30 wherein said fuel burns in a stratified combustion mode.

32. The method of claim 30 wherein said fuel comprises natural gas.

33. The method of claim 31 wherein said fuel comprises natural gas.

34. The method of claim 16 wherein said fuel comprises natural gas.

* * * * *